US007986705B2

(12) United States Patent
Batalden et al.

(10) Patent No.: US 7,986,705 B2
(45) Date of Patent: Jul. 26, 2011

(54) DETERMINING A TRANSMISSION ORDER FOR FRAMES BASED ON BIT REVERSALS OF SEQUENCE NUMBERS

(75) Inventors: Glenn Darrell Batalden, Rochester, MN (US); Timothy Pressier Clark, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1045 days.

(21) Appl. No.: 11/762,352

(22) Filed: Jun. 13, 2007

(65) Prior Publication Data
US 2008/0313684 A1 Dec. 18, 2008

(51) Int. Cl.
H04L 12/28 (2006.01)
H04L 12/56 (2006.01)
(52) U.S. Cl. ....................................................... 370/412
(58) Field of Classification Search .................. None
See application file for complete search history.

(56) References Cited

U.S. PATENT DOCUMENTS

| 5,561,456 | A | 10/1996 | Yu |
| 5,568,181 | A | 10/1996 | Greenwood et al. |
| 5,594,924 | A | 1/1997 | Ottesen et al. |
| 5,610,841 | A | 3/1997 | Tanaka |
| 5,630,104 | A | 5/1997 | Ottesen et al. |
| 5,930,252 | A | 7/1999 | Aaker et al. |
| 6,543,053 | B1 * | 4/2003 | Li et al. ............................. 725/88 |
| 6,715,126 | B1 | 3/2004 | Chang et al. |
| 6,970,939 | B2 | 11/2005 | Sim |
| 7,548,984 | B2 | 6/2009 | Kurauchi |
| 2002/0029284 | A1 * | 3/2002 | Agarwal et al. ............... 709/231 |
| 2003/0026254 | A1 | 2/2003 | Sim |
| 2003/0103564 | A1 | 6/2003 | Hanaki |
| 2004/0098509 | A1 * | 5/2004 | Alfano ........................ 709/249 |
| 2006/0089997 | A1 | 4/2006 | Inokuchi |
| 2006/0212668 | A1 | 9/2006 | Furukawa |

OTHER PUBLICATIONS

U.S. Appl. No. 11/381,382, entitled "Apparatus and Method for Serving Digital Content Across Multiple Network Elements," filed May 30, 2006 by Glenn Batalden et al.
U.S. Appl. No. 11/466,820, entitled "Method for Implementing On-Demand PVR Peer-to-Peer Media Sharing with Content Restraint," filed Aug. 24, 2006 by Byron L. Bailey et al.
U.S. Appl. No. 11/523,680, entitled "On Demand Dynamic Advertisement Insertion in an Internet Protocol Stream," filed Sep. 19, 2006 by David C. Olds.
"IPTV/Triple Play Testing—Screen Test," European Communications, Oct. 4, 2005, http://www.eurocomms.co.uk/features/features.ehtml?o=966.

* cited by examiner

Primary Examiner — Chirag G Shah
Assistant Examiner — Minh-Trang Nguyen
(74) Attorney, Agent, or Firm — Owen J. Gamon

(57) ABSTRACT

In an embodiment, frames are received in an arrival order. Each of the frames has a target client and a sequence number that represents a relative position of the frame in the arrival order. A transmission order is determined based on bit reversals of the sequence numbers. Then frames are then sent to the respective target client in the transmission order. A frame is sent to the target client from its slot during a respective time period that is associated with the slot. If the slot is empty, no data is sent during the respective time period. In this way, the transmission of frames is spread over the available time.

14 Claims, 14 Drawing Sheets

INDIRECTION TABLE FOR A QUEUE WHOSE LENGTH IS A BINARY POWER 154-1

| SEQUENCE # (334-1) | QUEUE INSERTION SLOT (336-1) | |
|---|---|---|
| 0000 | 0000 | 302 |
| 0001 | 1000 | 304 |
| 0010 | 0100 | 306 |
| 0011 | 1100 | 308 |
| 0100 | 0010 | 310 |
| 0101 | 1010 | 312 |
| 0110 | 0110 | 314 |
| 0111 | 1110 | 316 |
| 1000 | 0001 | 318 |
| 1001 | 1001 | 320 |
| 1010 | 0101 | 322 |
| 1011 | 1101 | 324 |
| 1100 | 0011 | 326 |
| 1101 | 1011 | 328 |
| 1110 | 0111 | 330 |
| 1111 | 1111 | 332 |

FIG. 3A

DETERMINING A TRANSMISSION ORDER FOR FRAMES BASED ON BIT REVERSALS OF SEQUENCE NUMBERS

CROSS-REFERENCE TO RELATED APPLICATIONS

The present application is related to commonly-assigned patent application Ser. No. 11/762,347, to Glenn D. Batalden, et al., filed on even date herewith, entitled "SENDING CONTENT FROM MULTIPLE CONTENT SERVERS TO CLIENTS AT TIME REFERENCE POINTS," which is herein incorporated by reference. The present application is also related to commonly-assigned patent application Ser. No. 11/762,429, to Glenn D. Batalden, et al., filed on even date herewith, entitled "SENDING CONTENT FROM MULTIPLE QUEUES TO CLIENTS," which is herein incorporated by reference.

FIELD

An embodiment of the invention generally relates to determining the transmission order for frames of video based on the bit reversal of sequence numbers that represent the arrival order of the frames at a queue.

BACKGROUND

Years ago, computers were isolated devices that did not communicate with each other. But, computers are increasingly being connected together in networks. One use of this connectivity is for the real-time and near real-time audio and video transmission over networks, such as networks that use the Internet Protocol (IP). One of the challenges facing video-on-demand and IPTV (Internet Protocol Television) implementations is the difficulty of scheduling computational and network bandwidth and avoiding video "stuttering" that occurs as a delivery network approaches saturation. Traditional methods of broadcast delivery in an IP network result in latency that varies geometrically with utilization. This is generally represented as L=1/(1−M), where L is the latency factor and M is the utilization as a percentage of available bandwidth. As a result, e.g., data packets traveling in a network that is using 50% of its bandwidth take nearly twice as long to arrive as those in a 1% utilized network. Occasional latency and jitter may be acceptable in traditional IP applications (e.g., web browsing or file transfer), but a more reliable delivery method is required for transmitting real-time data such as on-demand video.

Another challenge facing video-on-demand and IPTV (Internet Protocol Television) implementations is that the introduction of a video content load into a network provides high spikes of network utilization. When networks are driven into periodic high (e.g., 90-100 percent) utilization, the chances for network congestion, errors, packet loss, and overloading increases significantly.

Currently, traffic shaping is the primary means to alleviate the effects of high network use and enable greater utilization of network resources. But, current traffic shaping algorithms (e.g., leaky bucket or token bucket) do their work after data has already entered the network. As a result, current traffic shaping algorithms may drop data (if too much data is entering a network link), requiring transmission, and they may introduce latency (via queuing delays). These effects introduce stutter into the stream received by the client device of the customer. To eliminate stuttering, client devices often buffer the data stream until enough data has been received to reliably cover up any subsequent interruptions in the stream. But, buffering introduces a noticeable delay when changing between streams, which may be acceptable when browsing the internet for video clips, but the typical television viewer expects to be able to flip through many channels with little or no delay. To compete with cable television delivery, Internet television implementations must provide clear, uninterrupted transmission and must permit very fast channel changing, which is not provided by current technology.

Thus, what is needed is an enhanced technique for the delivery of audio/video data in a network.

SUMMARY

A method, apparatus, system, and storage medium are provided. In an embodiment frames are received at a queue in an arrival order. Each of the frames has a target client and a sequence number that represents a relative position of the frame in the arrival order. A transmission order is determined based on a bit reversal of the sequence numbers. Then frames are then sent to the respective target client in the transmission order. In an embodiment, the transmission order is determined by creating a slot number of a slot in a queue based on a bit reversal of an order of bits of the sequence number and adding the respective frame to the respective slot. A frame is sent to the target client from its slot in the queue during a respective time period that is associated with the slot if the respective slot contains the respective frame. If the slot is empty, no data is sent during the respective time period. In an embodiment, the target clients are notified of insufficient bandwidth if a maximum data rate is less than the available bandwidth. In this way, the transmission of frames is spread over the available time.

BRIEF DESCRIPTION OF THE DRAWINGS

Various embodiments of the present invention are hereinafter described in conjunction with the appended drawings:

FIG. 3A depicts a block diagram of an example data structure for an indirection table for a queue whose length is a binary power, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

Figure 1:
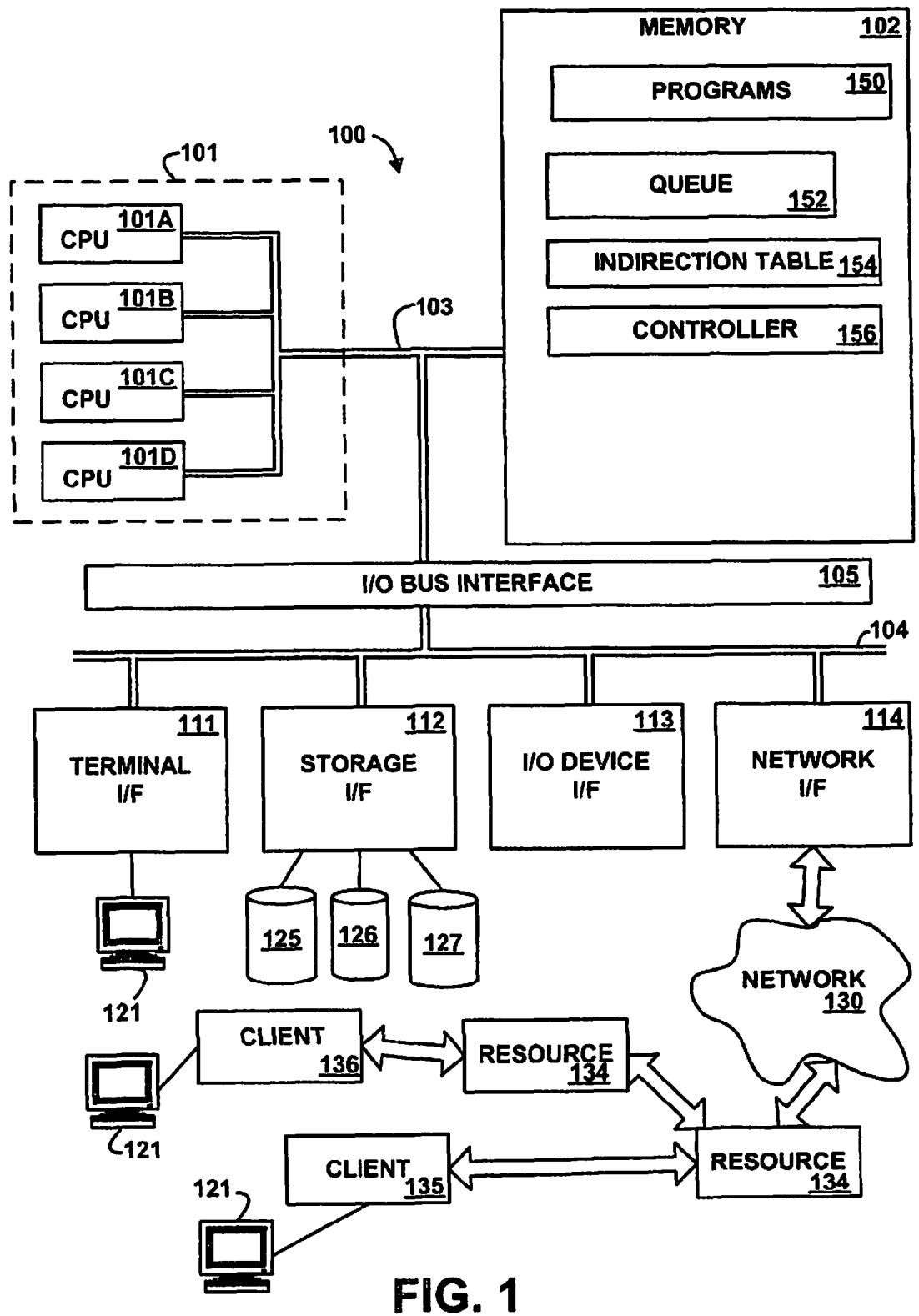
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to client computer systems 135 and 136 via a network 130 and resources 134, according to an embodiment of the present invention. The terms "client" and "server" are used herein for convenience only, and in various embodiments a computer system that operates as a client in one environment may operate as a server in another environment, and vice versa. In an embodiment, the hardware components of the computer systems 100, 135, and 136 and the resources 134 may be implemented by IBM System i5 computer systems available from International Business Machines Corporation of Armonk, N.Y. But, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes programs 150, a queue 152, an indirection table 154, and a controller 156. Although the programs 150, the queue 152, the indirection table 154, and the controller 156 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the programs 150, the queue 152, the indirection table 154, and the controller 156 are illustrated as being contained within the main memory 102, these elements are not necessarily all completely contained in the same storage device at the same time. Further, although the programs 150, the queue 152, the indirection table 154, and the controller 156 are illustrated as being separate entities, in other embodiments some of them, portions of some of them, or all of them may be packaged together.

The programs 150 may include video, audio, images, data, control data, formatting data, or any multiple or combination thereof, capable of being played or displayed via the user interface devices 121. The clients 135 and 136 request one or more of the programs, portions of which the controller 156 organizes into the queue 152 via the indirection table 154 and then transmits to the clients 135 and 136 via the network 130 and the resources 134. The programs 150 are further described below with reference to FIG. 2A. The queue 152 is further described below with reference to FIGS. 2B, 4, 5, 6, 7, 8, 9, 10, 11, 12, 13, 14, 15, 16, 17, 18, and 19. The indirection table 154 is further described below with reference to FIGS. 3A and 3B. In an embodiment, the controller 156 includes instructions capable of executing on the processor 101 or statements capable of being interpreted by instructions that execute on the processor 101, to carry out the functions as further described below with reference to FIGS. 20, 21, and 22. In another embodiment, the controller 156 is implemented in hardware via logical gates and other hardware devices in lieu of, or in addition to, a processor-based system.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interface) bus, or any other appropriate bus technology.

The I/O interface units support communication with a variety of storage and I/O devices. For example, the terminal interface unit 111 supports the attachment of one or more user terminals 121, which may include user output devices (such as a video display device, speaker, and/or television set) and user input devices (such as a keyboard, mouse, keypad, touchpad, trackball, buttons, light pen, or other pointing device).

The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O device interface 113 provides an interface to any of various other input/output devices or devices of other types, such as printers or fax machines. The network interface 114 provides one or more communications paths from the computer system 100 to other digital devices and the client computer systems 135 and 136; such paths may include, e.g., one or more networks 130 and one or more resources 134.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 may be a multi-user "mainframe" computer system, a single-user system, or a server or similar device that has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100, the client computer systems 135 and 136 and the resources 134. In various embodiments, the network 130 may represent a storage device or a combination of storage devices, either connected directly or indirectly to the computer system 100. In an embodiment, the network 130 may support the Infiniband architecture. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

In various embodiments, the resources 134 may be implemented as routers, switches, or server computer systems and may include some or all of the hardware components previously described above as being included in the server computer system 100. The resources 134 in a path from the server 100 to the clients 135 and 136 receive transmitted frames and retransmit the frames along the path. The client computer systems 135 and 136 may be implemented as set top boxes or television sets and may include some or all of the hardware components previously described above as being included in the server computer system 100. The client computer systems 135 and 136 are connected to user I/O devices 121, on which frames may be displayed or played.

It should be understood that FIG. 1 is intended to depict the representative major components of the server computer system 100, the network 130, the resources 134, and the client computer systems 135 and 136 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., and are referred to hereinafter as "computer programs," or simply "programs." The computer programs typically comprise one or more instructions that are resident at various times in various memory and storage devices in the server computer system 100 and/or the server computer system 100, and that, when read and executed by one or more processors in the server computer system 100 cause the server computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the server computer system 100 via a variety of tangible signal-bearing media that may be operatively or communicatively connected (directly or indirectly) to the processor or processors, such as the processor 101. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), the main memory 102, CD-RW, or diskette; or (3) information conveyed to the server computer system 100 by a communications medium, such as through a computer or a telephone network, e.g., the network 130.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2A:
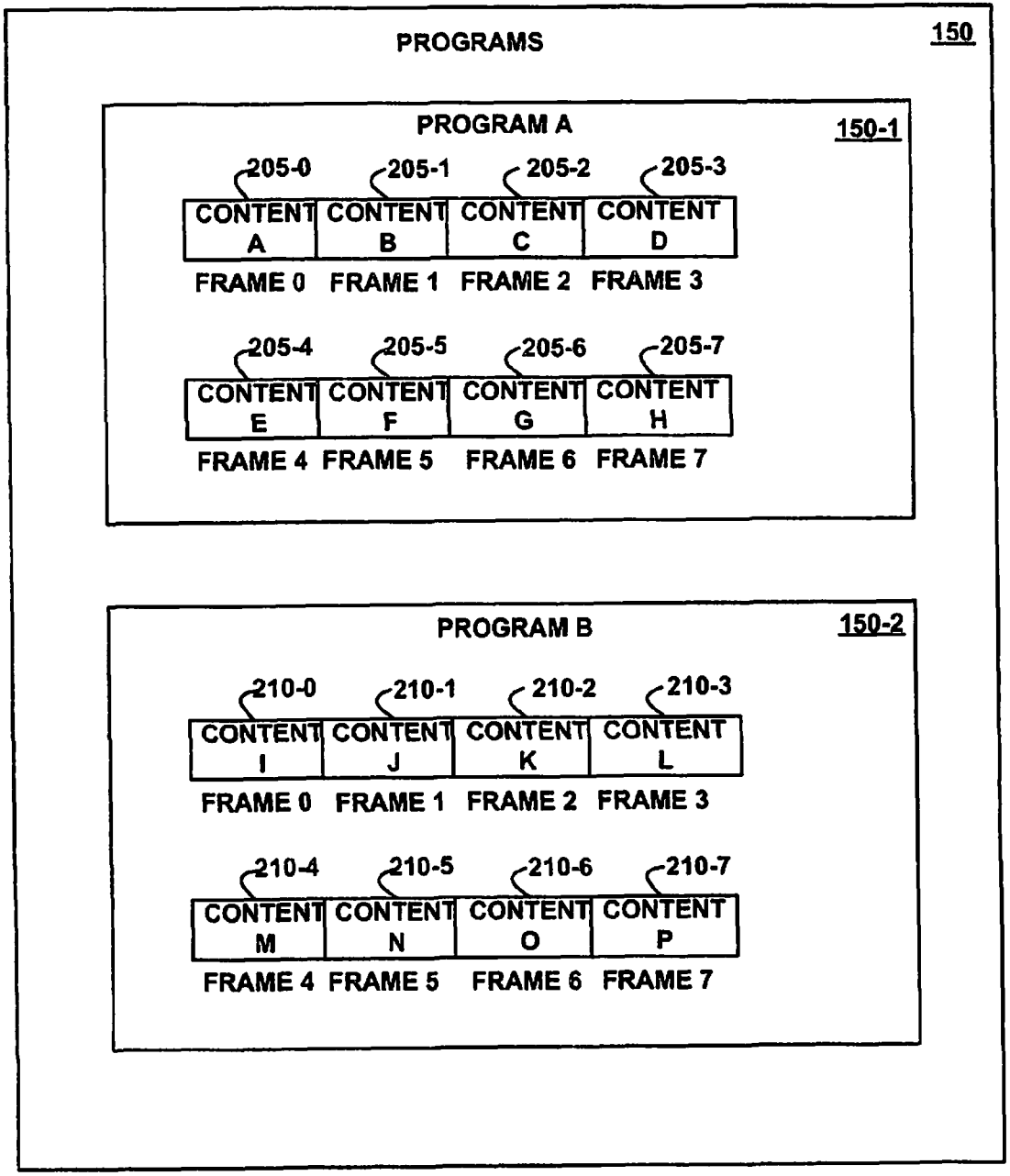
FIG. 2A depicts a block diagram of example programs, according to an embodiment of the invention.

FIG. 2A depicts a block diagram of an example programs 150, according to an embodiment of the invention. The programs 150 include example programs 150-1 and 150-2. The program 150-1 includes example frames 205-0, 205-1, 205-2, 205-3, 205-4, 205-5, 205-6, and 205-7 having respective frame numbers of frame 0, frame 1, frame 2, frame 3, frame 4, frame 5, frame 6, and frame 7, and respective content of content A, content B, content C, content D, content E, content F, content G, and content H. The program 150-2 includes example frames 210-0, 210-1, 210-2, 210-3, 210-4, 210-5, 210-6, and 210-7 having respective frame numbers of frame 0, frame 1, frame 2, frame 3, frame 4, frame 5, frame 6, and frame 7, and respective content of content I, content J, content K, content L, content M, content N, content O, and content P.

A frame represents material or data that may be presented via the user device 121 at any one time. For example, if the frames include video, a frame is a still image, and displaying frames in succession over time, in frame number order, creates the illusion, to the viewer, of motion or a moving picture. Frames per second (FPS) is a measure of how much information is used to store and display motion video. Frames per second applies equally to film video and digital video. The more frames per second, the smoother the motion appears. Television in the United States, for example, is based on the NTSC (National Television System Committee) format, which displays 30 interlaced frames per second while movies or films commonly display 24 frames per second.

But, in other embodiments, any number of frames per second and any appropriate format or standard for storing and presenting the programs 150 may be used. Embodiments of the invention may include video only, video and audio, audio only, or still images. Examples of various standards and formats in which the frames may be stored include: PAL (Phase Alternate Line), SECAM (Sequential Color and Memory), RS170, RS 330, HDTV (High Definition Television), MPEG (Motion Picture Experts Group), DVI (Digital Video Interface), SDI (Serial Digital Interface), MP3, QuickTime, RealAudio, and PCM (Pulse Code Modulation).

In other embodiments, the frames represent network frames, which are blocks of data that are transmitted together across the network 130, and multiple network frames may be necessary to compose one movie or television frame. The content of the frames may include movies, television programs, educational programs, instructional programs, training programs, audio, video, advertisements, public service announcements, games, text, images, or any portion, combination, or multiple thereof. In addition to the displayable or presentable data, the frames may also include other information, such as control information, formatting information, timing information, frame numbers, sequence numbers, and identifiers of the programs and/or target clients.

The frame numbers represent the sequence or order that the frames are to be presented or displayed within their respective programs via the user interface device 121, but the frames may be transmitted across the network 130 in a different order, as further described below. For example, if the program 150-1 is transmitted to the client 135, when the client 135 plays the program 150-1 at its user interface device 121, the content of the program 150-1 is played in the order of 205-0,

205-1, 205-2, 205-3, 205-4, 205-5, 205-6, and finally 205-7. Similarly, if the program 150-2 is transmitted to the client 136, when the client 136 plays the program 150-2 at its user interface device 121, the content of the program 150-2 is played in the order of 210-0, 210-1, 210-2, 210-3, 210-4, 210-5, 210-6, and finally 210-7.

Figure 2B:
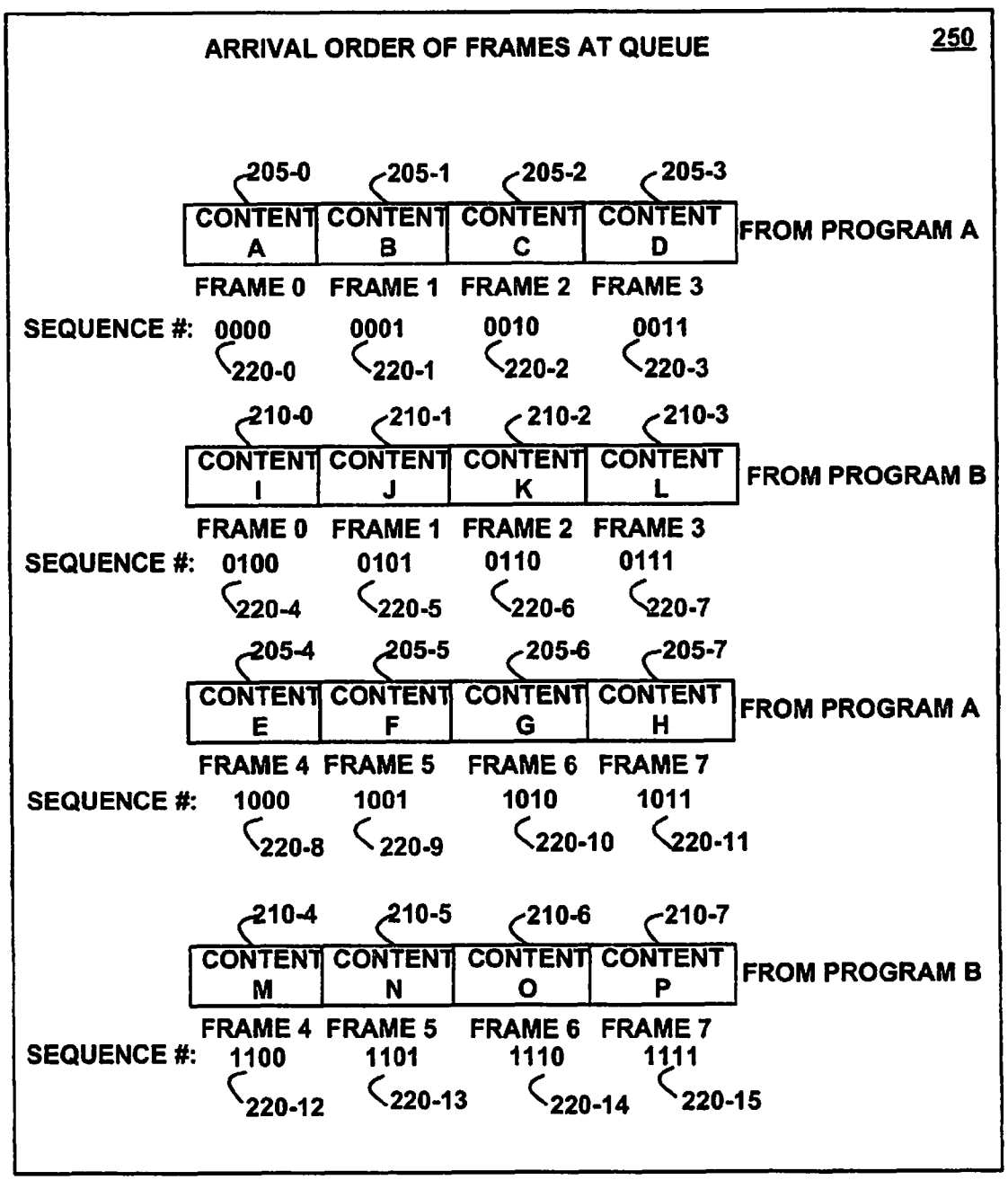
FIG. 2B depicts a block diagram of an example arrival order of frames at a queue, according to an embodiment of the invention.

FIG. 2B depicts a block diagram of an example arrival order 250 of frames at a queue, according to an embodiment of the invention. Because the server has one queue 152 (at any one time) from which frames may be transmitted across the network 130 to multiple clients, the clients may be receiving different programs, and these programs may start and end at different times, frames from different programs (e.g., the programs A 150-1 and B 150-2) may arrive at the queue 152 in an arbitrary order. Thus, in the example arrival order 250 of FIG. 2B, the frames 205-0, 205-1, 205-2, 205-3, 210-0, 210-1, 210-2, 210-3, 205-4, 205-5, 205-6, 205-7, 210-4, 210-5, 210-6, 210-7 arrive at the queue 152 in the arrival order represented by the sequence numbers 220-0, 220-1, 220-2, 220-3, 220-4, 220-5, 220-6, 220-7, 220-8, 220-9, 220-10, 220-11, 220-12, 220-13, 220-4, and 220-15, which represent the relative position of their respective frames in the arrival order. The frames 205-0, 205-1, 205-2, 205-3 are part of the program A 150-1, and have the respective sequence numbers 220-0, 220-1, 220-2, 220-3, 220-4. The frames 210-0, 210-1, 210-2, 210-3 are part of the program B 150-2, and have the respective sequence numbers 220-4, 220-5, 220-6, 220-7. The frames 205-4, 205-5, 205-6, 205-7 are part of the program A 150-1, and have the respective sequence numbers 220-8, 220-9, 220-10, 220-11. The frames 210-4, 210-5, 210-6, 210-7 are part of the program B 150-2 and have the respective sequence numbers 220-12, 220-13, 220-14, and 220-15.

The sequence numbers 220-0, 220-1, 220-2, 220-3, 220-4, 220-5, 220-6, 220-7, 220-8, 220-9, 220-10, 220-11, 220-12, 220-13, 220-14, and 220-15 are represented in FIG. 2B in binary form. Thus, binary 0000=decimal 0, binary 0001=decimal 1, binary 0010=decimal 2, binary 0011=decimal 3, etc, where binary numbers have a base of 2 and decimal numbers have a base of 10.

FIG. 3A depicts a block diagram of an example data structure for an indirection table 154-1 for a queue whose length is a binary power, according to an embodiment of the invention. The indirection table 154-1 is an example of the indirection table 154 (FIG. 1), and the indirection table 154 generically refers to indirection table 154-1. Queues having lengths that are binary powers are queues with lengths (the number of slots in the queue) of $2^0=1$, $2^1=2$, $2^2=4$, $2^3=8$, $2^4=16$, etc. For example, the indirection table 154-1 is used for a queue 152 whose length is $2^4=16$ since the indirection table 154-1 has 16 records. The controller 156 uses the indirection table 154 to determine the insertion slot in the queue 152, in which to insert or add an incoming frame based on the sequence number of the frame in the arrival order of frames at the queue 152.

Thus, the indirection table 154-1 includes example records 302, 304, 306, 308, 310, 312, 314, 316, 318, 320, 322, 324, 326, 328, 330, and 332, each record having a sequence number field 334-1 and an associated or corresponding queue insertion slot field 336-1. The queue insertion slot field 336-1 includes slot numbers that are the bit reversals of the corresponding sequence numbers 334-1, that is, the order of the bits in the sequence numbers 334-1 are reversed in the queue insertion slots 336-1, so that the highest order bit is swapped with the lowest order bit, the next highest order bit is swapped with the next lowest order bit, and so on. For example, the queue insertion slot number "0000" in record 302 is the bit reversal of the corresponding sequence number "0000"; the queue insertion slot number "1000" in the record 304 is the bit reversal of the corresponding sequence number "0001"; and the queue insertion number "0100" in the record 306 is the bit reversal of the corresponding sequence number "0010", etc.

Figure 3B:
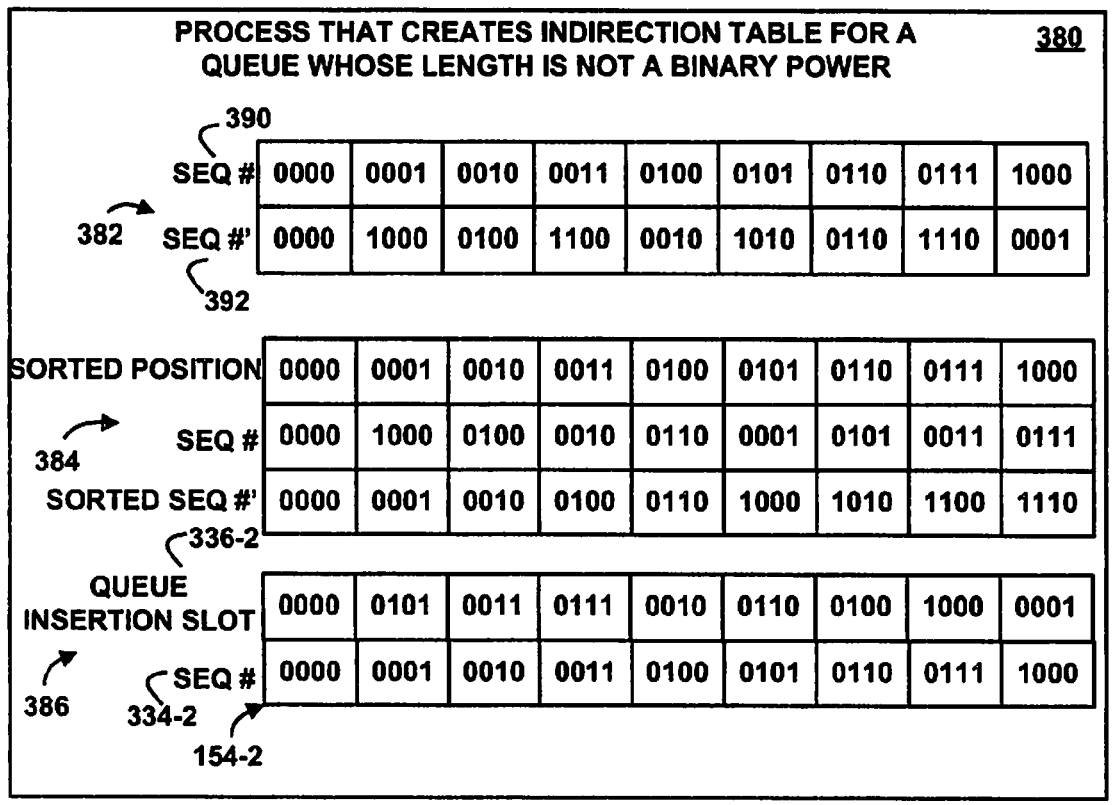
FIG. 3B depicts a block diagram of an example process that creates an indirection table for a queue whose length is not a binary power, according to an embodiment of the invention.

FIG. 3B depicts a block diagram of an example process 380 that creates an indirection table 154-2 for a queue whose length is not a binary power, according to an embodiment of the invention. The example process 380 is further described below with reference to FIG. 20. The indirection table 154-2 is an example of the indirection table 154 (FIG. 1), and the indirection table 154 generically refers to indirection table 154-2. In the example of FIG. 3B, the controller 156 creates then indirection table 154 for a queue 152 whose length is 9, which is not a power of 2.

The process 380 of FIG. 3B illustrates three steps 382, 384, and 386 for the creation of the indirection table 154-2. In the step 382, the controller 156 performs a bit reversal of the sequence numbers 390, resulting in the corresponding sequence numbers' 392. Thus, the controller 156 builds a list of ordered pairs of sequence numbers 390 and their bit reversals (sequence numbers' 392).

In the step 384, the controller 156 sorts the list of sequence numbers and their bit reversals by the sequence numbers', from the smallest sequence number' to the largest sequence number'. The controller 156 further assigns a relative sorted position (or index number in the sorted order from lowest to highest) to each of the order pairs of sorted bit reversals and their corresponding sequence numbers.

In the step 386, the controller 156 sets the queue insertion slot 336-2 for each sequence number 334-2 to be the sorted position of the sequence number in the list and then sorts the list by the sequence number 334-2, to create the indirection table 154-2 for a queue 152 whose length is not a binary power.

Figure 4:
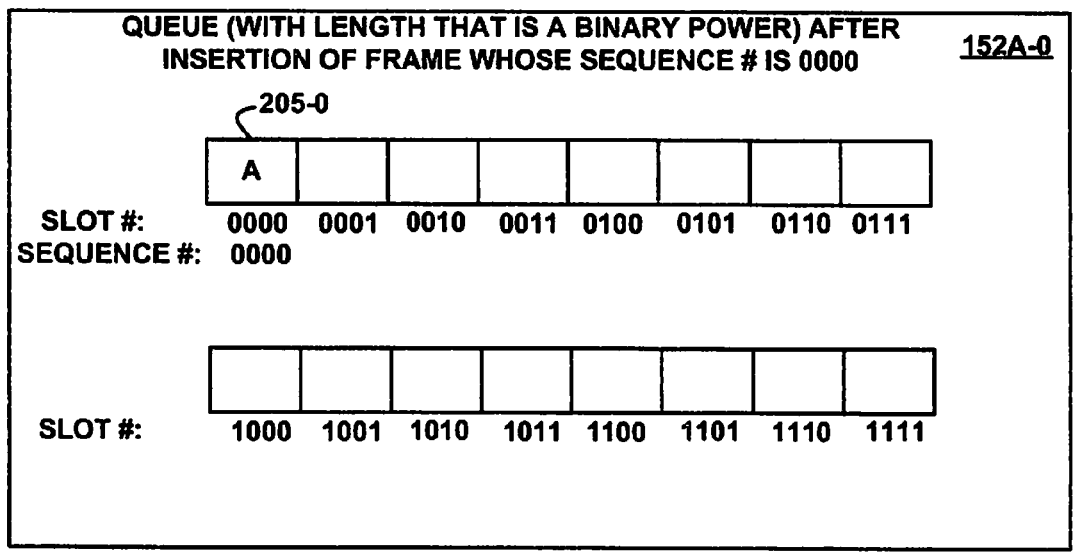
FIG. 4 depicts a block diagram of an example queue (with a length that is a binary power) after insertion of a frame whose sequence number is "0000," according to an embodiment of the invention.

FIG. 4 depicts a block diagram of an example queue 152A-0 (with a length that is a binary power) after insertion of a frame whose sequence number is "0000," according to an embodiment of the invention. The queue 152A-0 is an example of the queue 152 (FIG. 1). The queue has slot numbers labeled "0000," "0001," "0010," "0011," "0100," "0101," "0110," "0111," "1000," "1001," "1010," "1011," "1100," "1101," "1110," and "1111," which are illustrated in binary form.

The frame whose sequence number is "0000" is the first frame to arrive at the queue 152A-0 subsequent to a previous emptying of the queue by transmitting the contents of the queue to the target clients for which the frames are intended. In response to arrival of the frame whose sequence number is "0000," (frame 205-0 of the program A 150-1 in FIG. 2A), the controller 156 finds the sequence number 334-1 in the indirection table 154-1 that matches the sequence number of the arriving frame (the controller 156 uses the indirection table 154-1 because the queue 152A-0 has 16 queue slots, which is a binary power) in the record 302, determines the corresponding queue insertion slot 336-1 of "0000" from the record 302, and adds the frame content 205-0 "A" to the corresponding queue insertion slot. Thus, the controller 156 adds the frame 205-0 (whose sequence number is "0000") to the slot number "0000" in the queue 152A-0.

Figure 5:
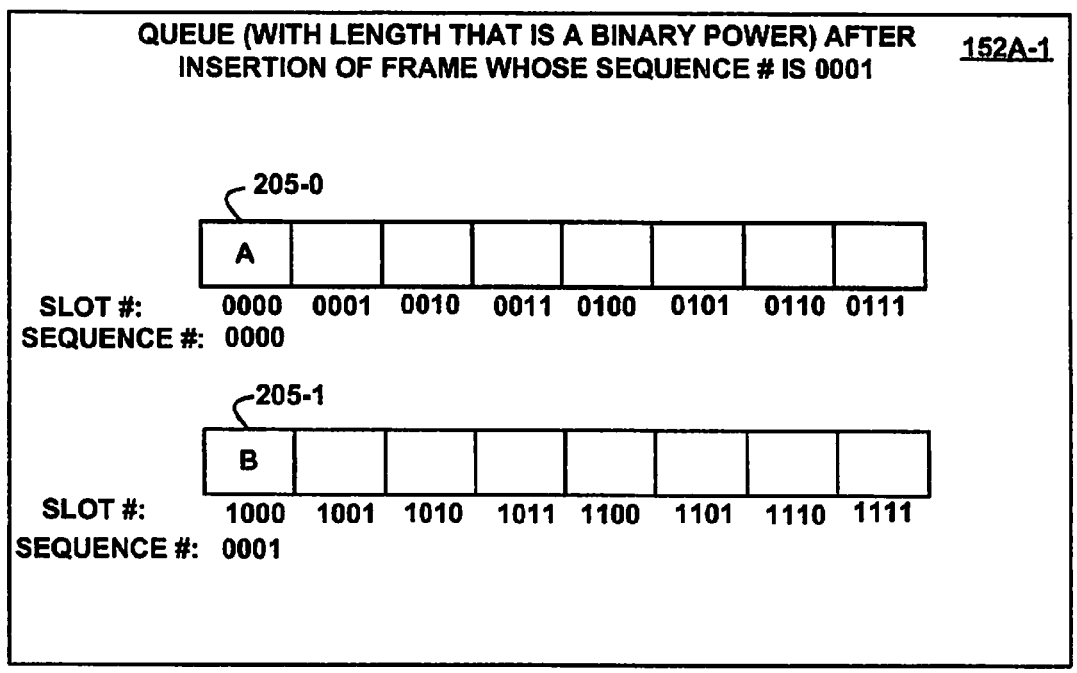
FIG. 5 depicts a block diagram of an example queue (with a length that is a binary power) after insertion of a frame whose sequence number is "0001," according to an embodiment of the invention.

FIG. 5 depicts a block diagram of an example queue 152A-1 (with a length that is a binary power) after insertion of a frame whose sequence number is "0001," according to an embodiment of the invention. The queue 152A-1 is an example of the queue 152 (FIG. 1), and the contents of the queue 152A-1 follow the contents of the queue 152A-0 in time.

The frame whose sequence number is "0001" is the next frame to arrive at the queue 152A-1 subsequent to the time of FIG. 4. In response to arrival of the frame whose sequence number is "0001," (the frame 205-1 of the program A 150-1 in FIG. 2A), the controller 156 finds the sequence number 334-1 in the indirection table 154-1 that matches the sequence number of the arriving frame in the record 304, determines the corresponding queue insertion slot 336-1 of "1000" from the record 304, and adds the frame content 205-1 "B" to the corresponding queue insertion slot. Thus, the controller 156 adds the frame 205-1 (whose sequence number is "0001") to the slot number "1000" in the queue 152A-1.

Figure 6:
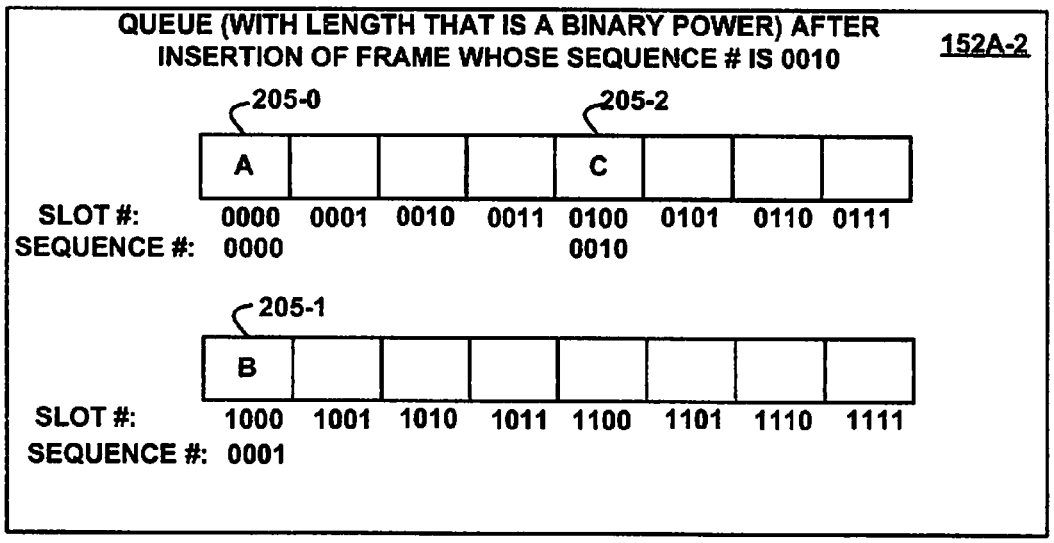
FIG. 6 depicts a block diagram of an example queue (with a length that is a binary power) after insertion of a frame whose sequence number is "0010," according to an embodiment of the invention.

FIG. 6 depicts a block diagram of an example queue (with a length that is a binary power) after insertion of a frame whose sequence number is "0010," according to an embodiment of the invention. The queue 152A-2 is an example of the queue 152 (FIG. 1), and the contents of the queue 152A-2 follow the contents of the queue 152A-1 in time.

The frame whose sequence number is "0010" is the next frame to arrive at the queue 152A-2 subsequent to the time of FIG. 5. In response to arrival of the frame whose sequence number is "0010," (the frame 205-2 of the program A 150-1 in FIG. 2A), the controller 156 finds the sequence number 334-1 in the indirection table 154-1 that matches the sequence number of the arriving frame in the record 306, determines the corresponding queue insertion slot 336-1 of "0100" from the record 306, and adds the frame content 205-2 "C" to the corresponding queue insertion slot. Thus, the controller 156 adds the frame 205-2 (whose sequence number is "0010") to the slot number "0100" in the queue 152A-2.

Figure 7:
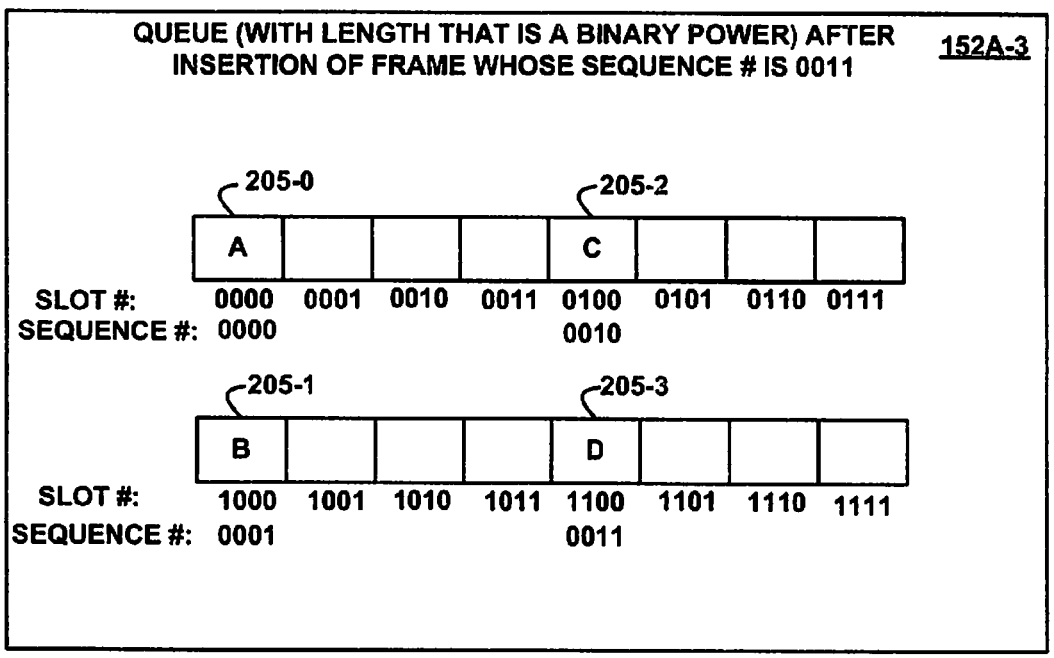
FIG. 7 depicts a block diagram of an example queue (with a length that is a binary power) after insertion of a frame whose sequence number is "0011," according to an embodiment of the invention.

FIG. 7 depicts a block diagram of an example queue 152A-3 (with a length that is a binary power) after insertion of a frame whose sequence number is "0011," according to an embodiment of the invention. The queue 152A-3 is an example of the queue 152 (FIG. 1), and the contents of the queue 152A-3 follow the contents of the queue 152A-2 in time.

The frame whose sequence number is "0011" is the next frame to arrive at the queue 152A-3 subsequent to the time of FIG. 6. In response to arrival of the frame whose sequence number is "0011," (the frame 205-3 of the program A 150-1 in FIG. 2A), the controller 156 finds the sequence number 334-1 in the indirection table 154-1 that matches the sequence number of the arriving frame in the record 308, determines the corresponding queue insertion slot 336-1 of "1100" from the record 308, and adds the frame content 205-3 "D" to the corresponding queue insertion slot. Thus, the controller 156 adds the frame 205-3 (whose sequence number is "00111") to the slot number "1100" in the queue 152A-3.

Figure 8:
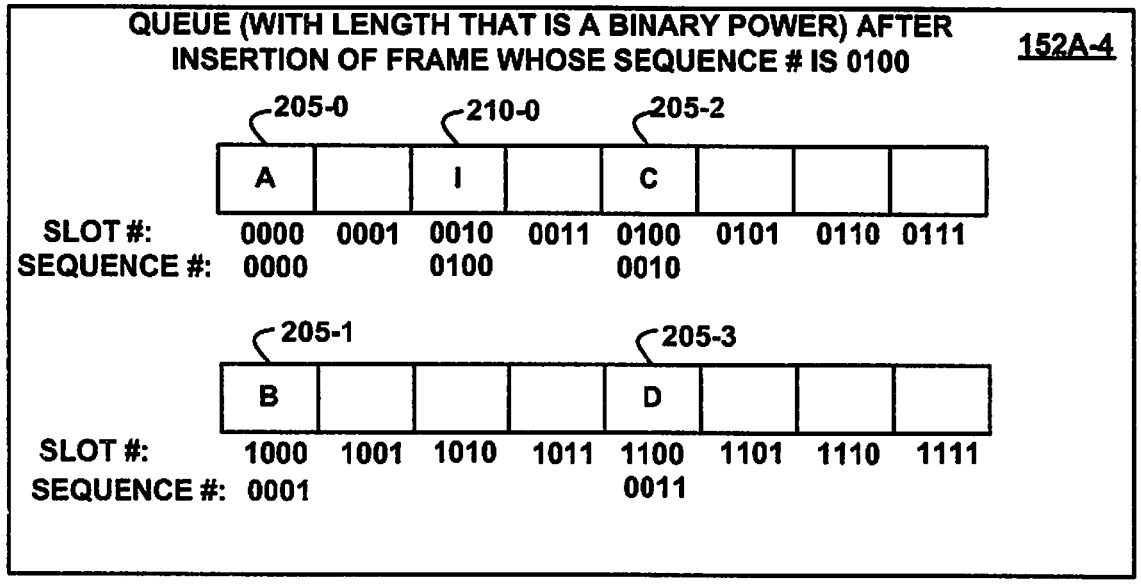
FIG. 8 depicts a block diagram of an example queue (with a length that is a binary power) after insertion of a frame whose sequence number is "0100," according to an embodiment of the invention.

FIG. 8 depicts a block diagram of an example queue 152A-4 (with a length that is a binary power) after insertion of a frame whose sequence number is "0100," according to an embodiment of the invention. The queue 152A-4 is an example of the queue 152 (FIG. 1), and the contents of the queue 152A-4 follow the contents of the queue 152A-3 in time.

The frame whose sequence number is "0100" is the next frame to arrive at the queue 152A-4 subsequent to the time of FIG. 7. In response to arrival of the frame whose sequence number is "0100," (the frame 210-0 of the program B 150-2 in FIG. 2A), the controller 156 finds the sequence number 334-1 in the indirection table 154-1 that matches the sequence number of the arriving frame in the record 310, determines the corresponding queue insertion slot 336-1 of "0010" from the record 310, and adds the frame content 210-0 "I" to the corresponding queue insertion slot. Thus, the controller 156 adds the frame 210-0 (whose sequence number is "0100") to the slot number "0010" in the queue 152A-4.

Figure 9:
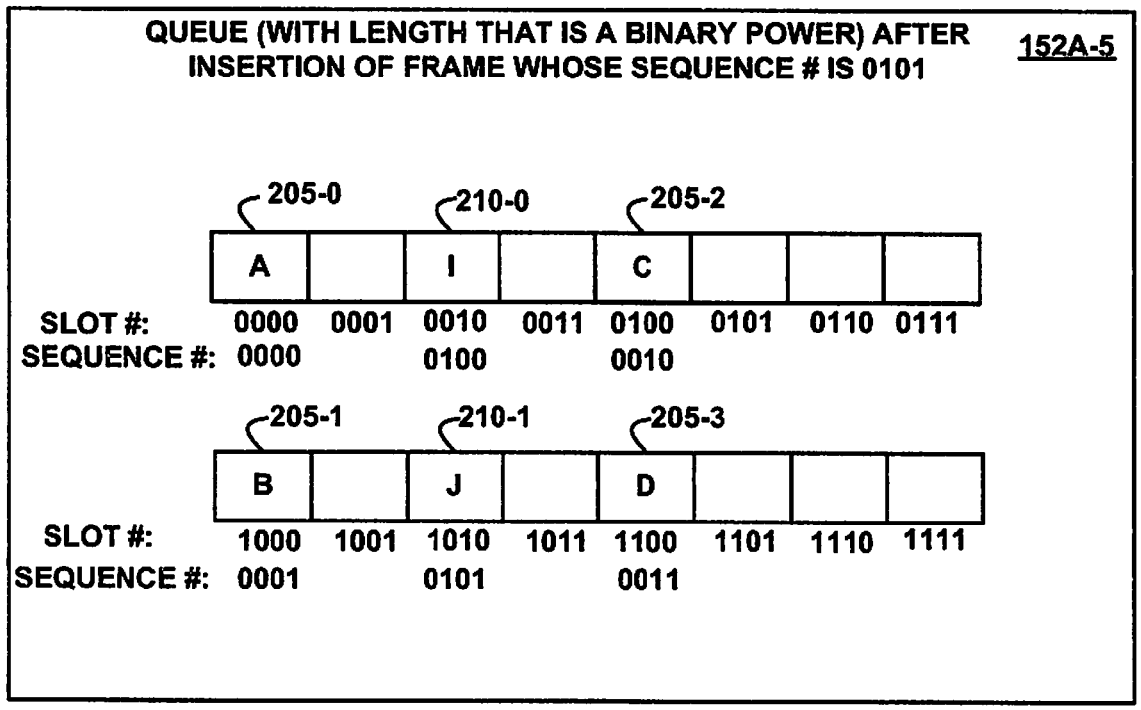
FIG. 9 depicts a block diagram of an example queue (with a length that is a binary power) after insertion of a frame whose sequence number is "0101," according to an embodiment of the invention.

FIG. 9 depicts a block diagram of an example queue 152A-5 (with a length that is a binary power) after insertion of a frame whose sequence number is "0101," according to an embodiment of the invention. The queue 152A-5 is an example of the queue 152 (FIG. 1), and the contents of the queue 152A-5 follow the contents of the queue 152A-4 in time.

The frame whose sequence number is "0101" is the next frame to arrive at the queue 152A-5 subsequent to the time of FIG. 8. In response to arrival of the frame whose sequence number is "0101," (the frame 210-1 of the program B 150-2 in FIG. 2A), the controller 156 finds the sequence number 334-1 in the indirection table 154-1 that matches the sequence number of the arriving frame in the record 312, determines the corresponding queue insertion slot 336-1 of "1010" from the record 312, and adds the frame content 210-1 "J" to the corresponding queue insertion slot. Thus, the controller 156 adds the frame 210-1 (whose sequence number is "0101") to the slot number "1010" in the queue 152A-5.

Figure 10:
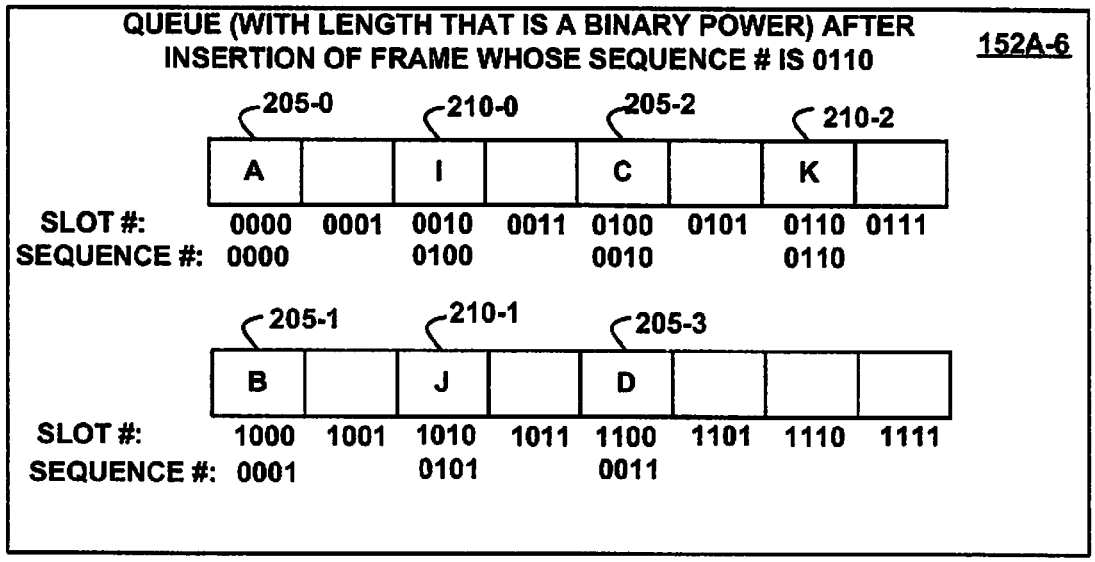
FIG. 10 depicts a block diagram of an example queue (with a length that is a binary power) after insertion of a frame whose sequence number is "0110," according to an embodiment of the invention.

FIG. 10 depicts a block diagram of an example queue 152A-6 (with a length that is a binary power) after insertion of a frame whose sequence number is "0110," according to an embodiment of the invention. The queue 152A-6 is an example of the queue 152 (FIG. 1), and the contents of the queue 152A-6 follow the contents of the queue 152A-5 in time.

The frame whose sequence number is "0110" is the next frame to arrive at the queue 152A-6 subsequent to the time of FIG. 9. In response to arrival of the frame whose sequence number is "0110," (the frame 210-2 of the program B 150-2 in FIG. 2A), the controller 156 finds the sequence number 334-1 in the indirection table 154-1 that matches the sequence number of the arriving frame in the record 314, determines the corresponding queue insertion slot 336-1 of "0110" from the record 314, and adds the frame content 210-2 "K" to the corresponding queue insertion slot. Thus, the controller 156 adds the frame 210-2 (whose sequence number is "0110") to the slot number "0110" in the queue 152A-6.

Figure 11:
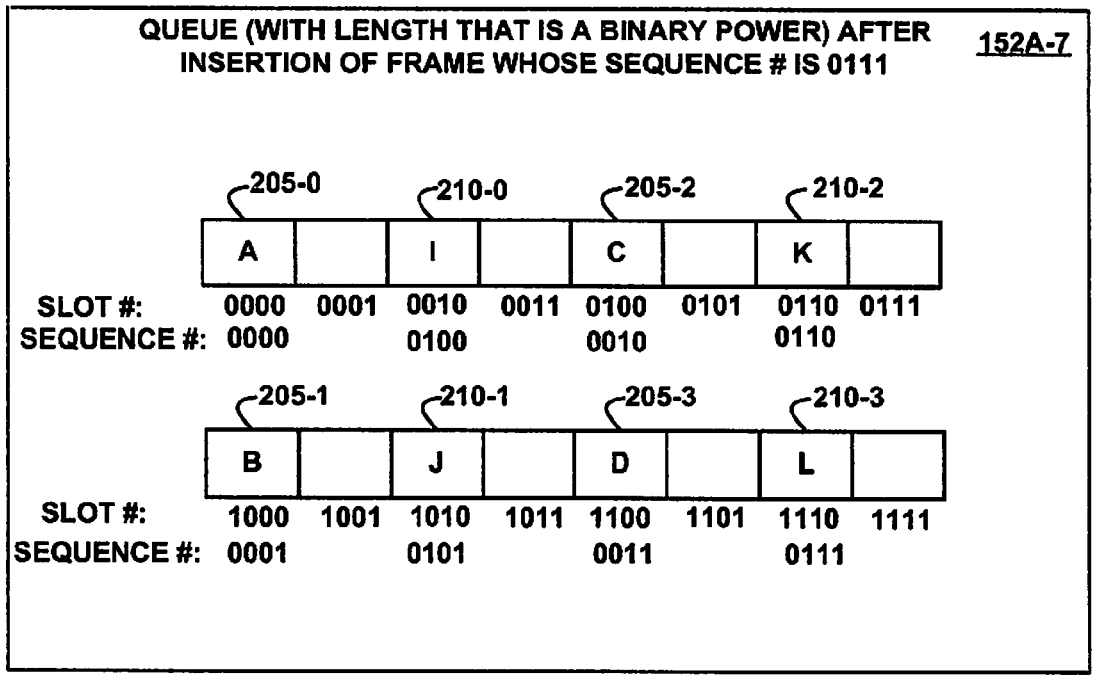
FIG. 11 depicts a block diagram of an example queue (with a length that is a binary power) after insertion of a frame whose sequence number is "0111," according to an embodiment of the invention.

FIG. 11 depicts a block diagram of an example queue 152A-7 (with a length that is a binary power) after insertion of a frame whose sequence number is "0111," according to an embodiment of the invention. The queue 152A-7 is an example of the queue 152 (FIG. 1), and the contents of the queue 152A-7 follow the contents of the queue 152A-6 in time.

The frame whose sequence number is "0111" is the next frame to arrive at the queue 152A-7 subsequent to the time of FIG. 10. In response to arrival of the frame whose sequence number is "0111," (the frame 210-3 of the program B 150-2 in FIG. 2A), the controller 156 finds the sequence number 334-1 in the indirection table 154-1 that matches the sequence number of the arriving frame in the record 316, determines the corresponding queue insertion slot 336-1 of "1110" from the record 316, and adds the frame content 210-3 "L" to the corresponding queue insertion slot. Thus, the controller 156 adds the frame 210-3 (whose sequence number is "01111") to the slot number "1110" in the queue 152A-7.

Each of the slots in the queue 152 has an associated time period for transmission, and the transmission time periods have the same order as the slot numbers. The controller 156 sends the content of the slots to their intended target clients in the order specified by the slot numbers and during the time periods associated with the slots. If a slot is empty (does not contain any content), then the controller 156 does not transmit any content during the time period associated with the empty slot. Thus, in the example of FIG. 11, if the controller 156 transmits the queue contents after insertion of the frame whose sequence number is "0111," then the controller 156 transmits the frame 205-0 having content A during a $0^{th}$ time period associated with slot number "0000," refrains from transmitting (waits and does not transmit) during a $1^{st}$ time period associated with the empty slot number "0001," transmits the frame 210-0 during a $2^{nd}$ time period associated with the slot number "0010," refrains from transmitting during a 3rd time period associated with the empty slot number "0011," transmits the frame 205-2 having content C during a 4th time period associated with the slot number "0100," and so on, until all frames in the queue have been transmitted, or until the time for transmission is over. The $1^{st}$ time period is after the $0^{th}$ time period, the $2^{nd}$ time period is after the $1^{st}$ time period, the $3^{rd}$ time period is after the $2^{nd}$ time period, and so on. Thus, by spreading the insertion of the frame content evenly into the available queue slots, and subsequently transmitting the contents of the queue in slot order during corresponding time periods, the controller 156 spreads the transmission of the frame content to the target clients evenly over the available transmission time.

Figure 12:
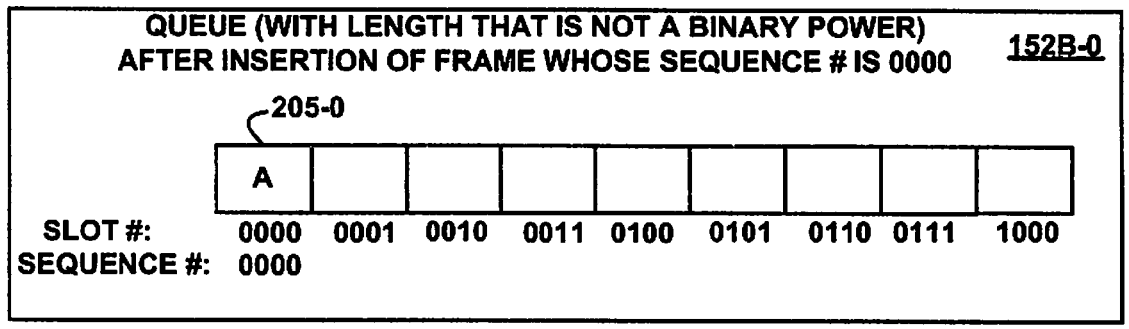
FIG. 12 depicts a block diagram of an example queue (with a length that is a not binary power) after insertion of a frame whose sequence number is "0000," according to an embodiment of the invention.

FIG. 12 depicts a block diagram of an example queue 152B-0 (with a length that is a not binary power) after insertion of a frame whose sequence number is "0000," according to an embodiment of the invention. The queue 152B-0 is an example of the queue 152 (FIG. 1). The queue has slot numbers labeled "0000," "0001," "0010," "0011," "0100," "0101," "0110," "0111," and "1000," which are illustrated in binary form.

The frame whose sequence number is "0000" is the first frame to arrive at the queue 152B-0 subsequent to a previous emptying of the queue by transmitting the contents of the queue to the target clients for which the frames are intended. In response to arrival of the frame whose sequence number is "0000," (frame 205-0 of the program A 150-1 in FIG. 2A), the controller 156 finds a record in the indirection table 154-2 with a sequence number 334-2 that matches the sequence number of the arriving frame (the controller 156 uses the indirection table 154-2 because the queue 152B-0 has 9 queue slots, which is not a binary power), determines the corresponding queue insertion slot 336-2 of "0000" from the found record, and adds the frame content 205-0 "A" to the corresponding queue insertion slot. Thus, the controller 156 adds the frame 205-0 (whose sequence number is "0000") to the slot number "0000" in the queue 152B-0.

Figure 13:
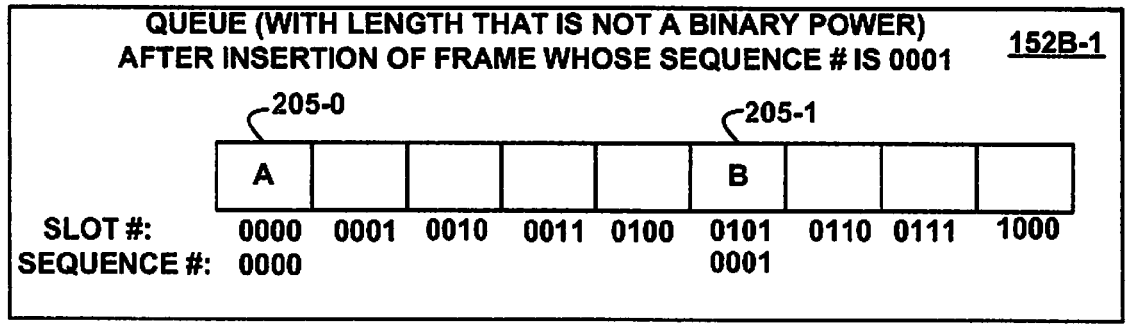
FIG. 13 depicts a block diagram of an example queue (with a length that is a not binary power) after insertion of a frame whose sequence number is "0001," according to an embodiment of the invention.

FIG. 13 depicts a block diagram of an example queue 152B-1 (with a length that is a not binary power) after insertion of a frame whose sequence number is "0001," according to an embodiment of the invention. The queue 152B-1 is an example of the queue 152 (FIG. 1).

The frame whose sequence number is "0001" is the next frame to arrive at the queue 152B-1 after the time of FIG. 12. In response to arrival of the frame whose sequence number is "0001," (the frame 205-1 of the program A 150-1 in FIG. 2A), the controller 156 finds a record in the indirection table 154-2 with a sequence number 334-2 that matches the sequence number of the arriving frame, determines the corresponding queue insertion slot 336-2 of "0101" from the found record, and adds the frame content 205-1 "B" to the corresponding queue insertion slot "0101."

Figure 14:
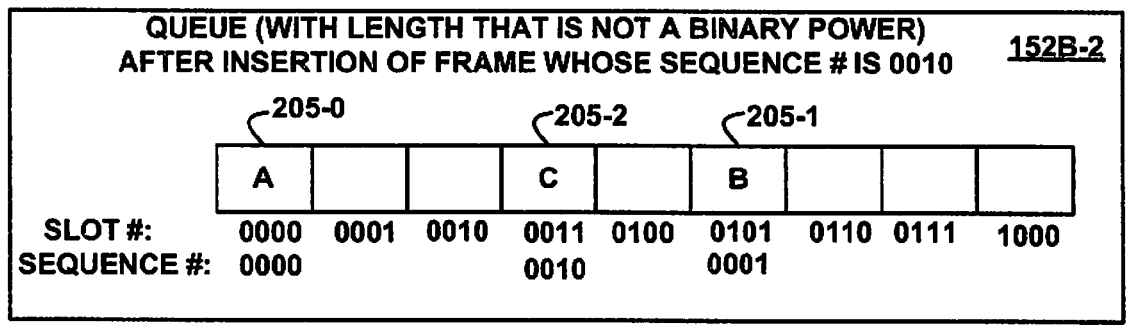
FIG. 14 depicts a block diagram of an example queue (with a length that is a not binary power) after insertion of a frame whose sequence number is "0010," according to an embodiment of the invention.

FIG. 14 depicts a block diagram of an example queue 152B-2 (with a length that is a not binary power) after insertion of a frame whose sequence number is "0010," according to an embodiment of the invention. The queue 152B-2 is an example of the queue 152 (FIG. 1).

The frame whose sequence number is "0010" is the next frame to arrive at the queue 152B-2 after the time of FIG. 13. In response to arrival of the frame whose sequence number is "0010," (the frame 205-2 of the program A 150-1 in FIG. 2A), the controller 156 finds a record in the indirection table 154-2 with a sequence number 334-2 that matches the sequence number of the arriving frame, determines the corresponding queue insertion slot 336-2 of "0011" from the found record, and adds the frame content 205-2 "C" to the corresponding queue insertion slot "0011."

Figure 15:
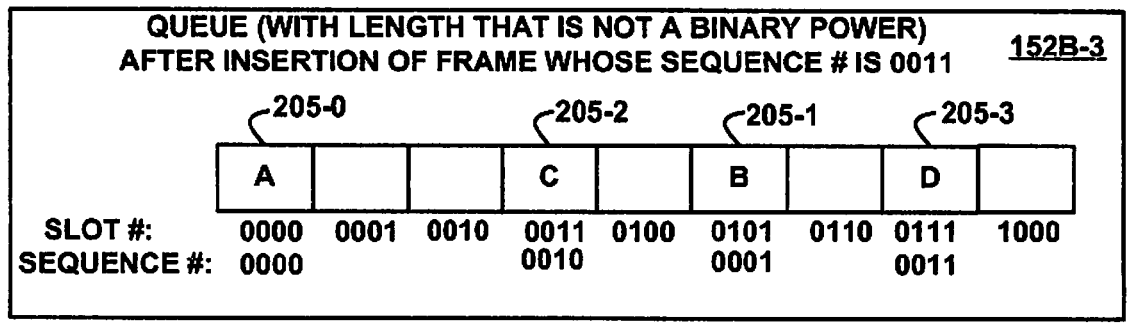
FIG. 15 depicts a block diagram of an example queue (with a length that is a not binary power) after insertion of a frame whose sequence number is "0011," according to an embodiment of the invention.

FIG. 15 depicts a block diagram of an example queue 152B-3 (with a length that is a not binary power) after insertion of a frame whose sequence number is "0011," according to an embodiment of the invention. The queue 152B-3 is an example of the queue 152 (FIG. 1).

The frame whose sequence number is "0011" is the next frame to arrive at the queue 152B-3 after the time of FIG. 14. In response to arrival of the frame whose sequence number is "0011," (the frame 205-3 of the program A 150-1 in FIG. 2A), the controller 156 finds a record in the indirection table 154-2 with a sequence number 334-2 that matches the sequence number of the arriving frame, determines the corresponding queue insertion slot 336-2 of "0111" from the found record, and adds the frame content 205-3 "D" to the corresponding queue insertion slot "0111."

Figure 16:
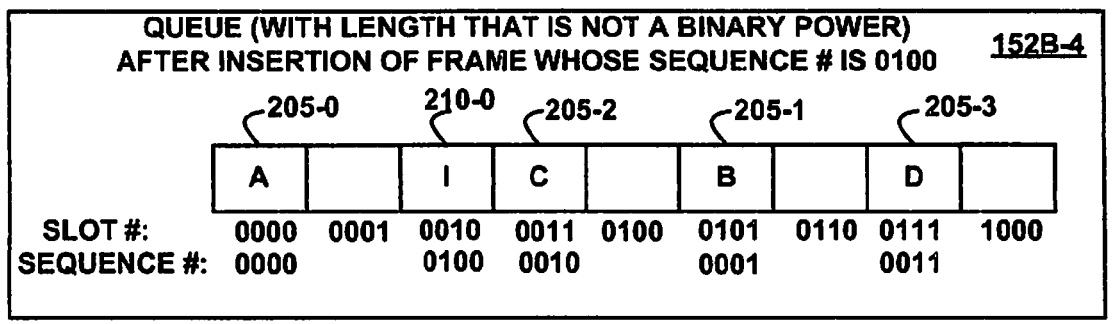
FIG. 16 depicts a block diagram of an example queue (with a length that is a not binary power) after insertion of a frame whose sequence number is "0100," according to an embodiment of the invention.

FIG. 16 depicts a block diagram of an example queue 152B-4 (with a length that is a not binary power) after insertion of a frame whose sequence number is "0100," according to an embodiment of the invention. The queue 152B-4 is an example of the queue 152 (FIG. 1).

The frame whose sequence number is "0100" is the next frame to arrive at the queue 152B-4 after the time of FIG. 15. In response to arrival of the frame whose sequence number is "0100," (the frame 210-0 of the program B 150-2 in FIG. 2A), the controller 156 finds a record in the indirection table 154-2 with a sequence number 334-2 that matches the sequence number of the arriving frame, determines the corresponding queue insertion slot 336-2 of "0010" from the found record, and adds the frame content 210-0 "I" to the corresponding queue insertion slot "0010."

Figure 17:
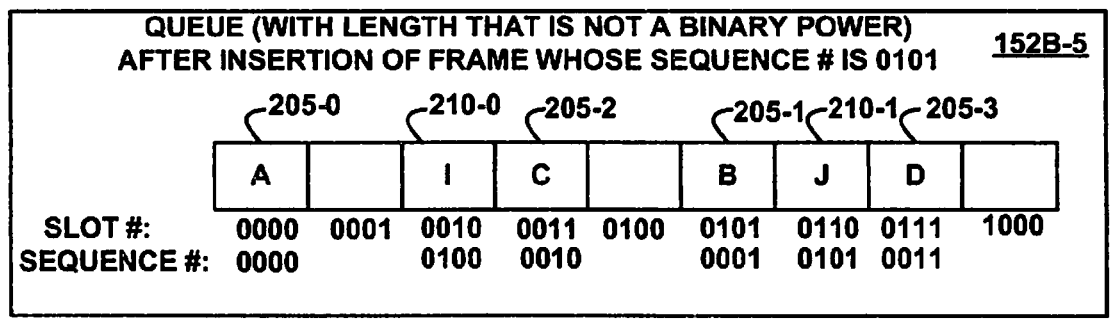
FIG. 17 depicts a block diagram of an example queue (with a length that is a not binary power) after insertion of a frame whose sequence number is "0101," according to an embodiment of the invention.

FIG. 17 depicts a block diagram of an example queue 152B-5 (with a length that is a not binary power) after insertion of a frame whose sequence number is "0101," according to an embodiment of the invention. The queue 152B-5 is an example of the queue 152 (FIG. 1).

The frame whose sequence number is "0101" is the next frame to arrive at the queue 152B-5 after the time of FIG. 16. In response to arrival of the frame whose sequence number is "0101," (the frame 210-1 of the program B 150-2 in FIG. 2A), the controller 156 finds a record in the indirection table 154-2 with a sequence number 334-2 that matches the sequence number of the arriving frame, determines the corresponding queue insertion slot 336-2 of "0110" from the found record, and adds the frame content 210-1 "J" to the corresponding queue insertion slot "0110."

Figure 18:
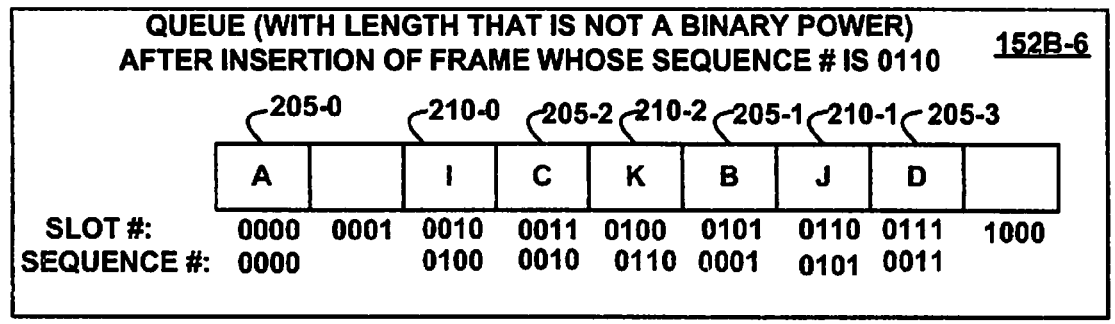
FIG. 18 depicts a block diagram of an example queue (with a length that is a not binary power) after insertion of a frame whose sequence number is "0110," according to an embodiment of the invention.

FIG. 18 depicts a block diagram of an example queue 152B-6 (with a length that is a not binary power) after insertion of a frame whose sequence number is "0110," according to an embodiment of the invention. The queue 152B-6 is an example of the queue 152 (FIG. 1).

The frame whose sequence number is "0110" is the next frame to arrive at the queue 152B-6 after the time of FIG. 17. In response to arrival of the frame whose sequence number is "0110," (the frame 210-2 of the program B 150-2 in FIG. 2A), the controller 156 finds a record in the indirection table 154-2 with a sequence number 334-2 that matches the sequence number of the arriving frame, determines the corresponding queue insertion slot 336-2 of "0100" from the found record, and adds the frame content 210-2 "K" to the corresponding queue insertion slot "0100."

Figure 19:
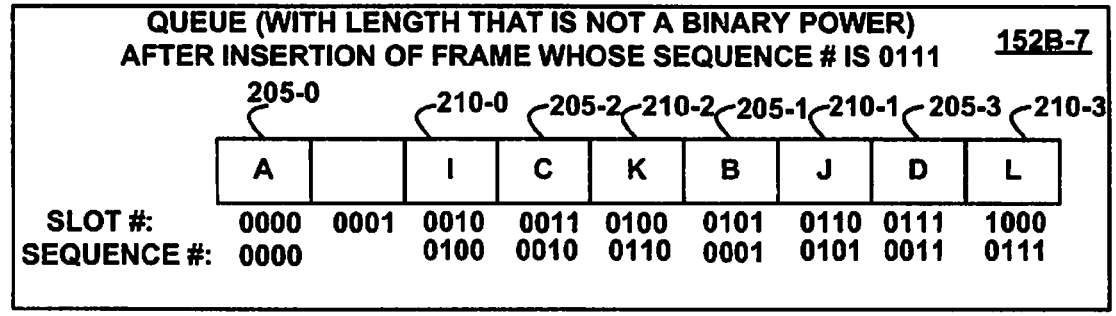
FIG. 19 depicts a block diagram of an example queue (with a length that is a not binary power) after insertion of a frame whose sequence number is "0111," according to an embodiment of the invention.

FIG. 19 depicts a block diagram of an example queue 152B-7 (with a length that is a not binary power) after insertion of a frame whose sequence number is "0111," according to an embodiment of the invention. The queue 152B-7 is an example of the queue 152 (FIG. 1).

The frame whose sequence number is "0111" is the next frame to arrive at the queue 152B-7 after the time of FIG. 18. In response to arrival of the frame whose sequence number is "0111," (the frame 210-3 of the program B 150-2 in FIG. 2A), the controller 156 finds a record in the indirection table 154-2 with a sequence number 334-2 that matches the sequence number of the arriving frame, determines the corresponding queue insertion slot 336-2 of "1000" from the found record, and adds the frame content 210-3 "L" to the corresponding queue insertion slot "1000."

Each of the slots in the queue has an associated time period for transmission, and the transmission time periods have the same order as the slot numbers. The controller 156 sends the content of the slots to their intended target clients in the order specified by the slot numbers and during the time periods associated with the slots. If a slot is empty (does not contain any content), then the controller 156 does not transmit any content during the time period associated with the empty slot. Thus, in the example of FIG. 19, if the controller 156 transmits the queue contents after insertion of the frame whose sequence number is "0111," then the controller 156 transmits the frame 205-0 having content A during a $0^{th}$ time period associated with slot number "0000," refrains from transmitting (waits and does not transmit) during a $1^{st}$ time period associated with the slot number "0001" (whose queue slot is empty), transmits the frame 210-0 during a 2 time period associated with the slot number "0010," transmits the frame 205-2 having content C during a 3rd time period associated with the slot number "0011," and so on, until all frames in the queue have been transmitted, or until the time for transmission is over. The $1^{st}$ time period is after the $0^{th}$ time period, the $2^{nd}$ time period is after the $1^{st}$ time period, the $3^{rd}$ time period is after the $2^{nd}$ time period, and so on. Thus, by spreading the insertion of the frame content as evenly as possible into the available queue slots, and subsequently transmitting the contents of the queue in slot order during corresponding time periods, the controller 156 spreads the transmission of the frame content to the target clients as evenly as possible over the available transmission time.

Figure 20:
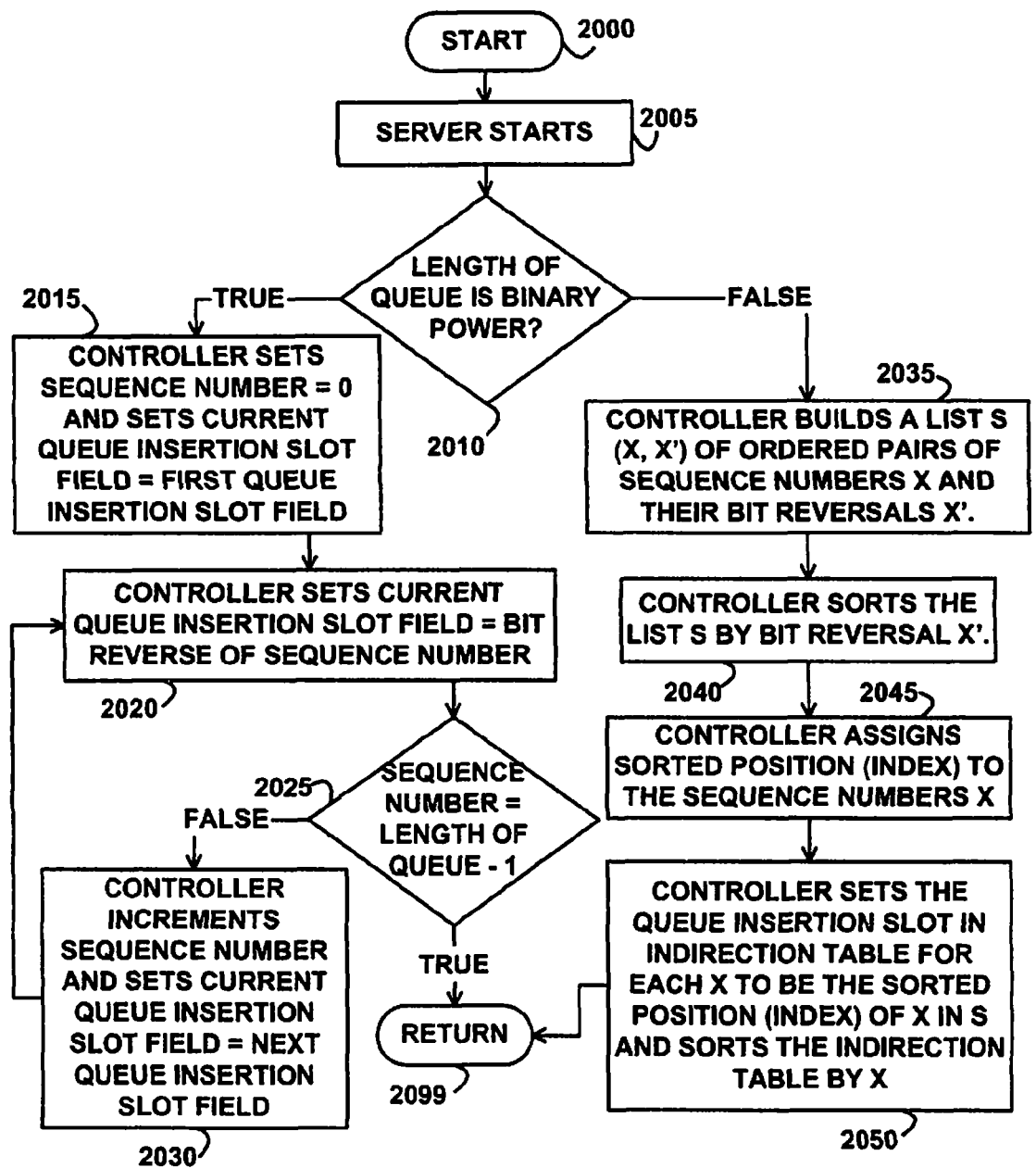
FIG. 20 depicts a flowchart of example processing for building indirection tables, according to an embodiment of the invention.

FIG. 20 depicts a flowchart of example processing for building indirection tables such as the indirection tables 154-1 of FIG. 3A and 154-2 of FIG. 3B, according to an embodiment of the invention. Control begins at block 2000.

Control then continues to block 2005 where the server computer system 100 starts or the controller 156 begins executing. Control then continues to block 2010 where the controller 156 determines whether the length of the queue 152 is a binary power. If the determination at block 2010 is true, then the length of the queue 152 is a binary power, so control continues to block 2015 where the controller 156 initializes the current sequence number to be zero and sets the current queue insertion slot field to be the first queue insertion slot field in the queue 152. Control then continues to block 2020 when the controller 156 sets the contents of the current queue insertion slot field to be the bit reversal of the current sequence number.

Control then continues to block 2025 where the controller 156 determines whether the current sequence number equals the length of the queue minus one. If the determination at block 2025 is true, then the current sequence number equals the length of the queue minus one, so all possible sequence numbers have been processed by the logic of FIG. 20, so control continues to block 2099 where the logic of FIG. 20 returns.

If the determination of the block 2025 is false, then the current sequence number is not yet equal to the length of the queue minus one, so control continues to block 2030 where the controller 156 increments the current sequence number and sets the current queue insertion slot field to be the next queue insertion slot field. Control then returns to block 2020 where the controller 156 processes the new current queue insertion slot field, as previously described above.

If the determination at block 2010 is false, then the length of the queue is not a binary power, so control continues to block 2035 where the controller 156 builds a list S (X, X') of ordered pairs of sequence numbers X and their bit reversals X', as previously described above with reference to step 382 in FIG. 3B. Control then continues to block 2040 where the controller 156 sorts the list S by the values of the bit reversals X', as previously described above with reference to step 384 in FIG. 3B. Control then continues to block 2045 where the controller 156 assigns the sorted position numbers (index numbers) to the sequence numbers X, as previously described above with reference to step 384 in FIG. 3B.

Control then continues to block 2050 where the controller 156 sets the queue insertion slot in the indirection table 154, for each sequence number X, to be the sorted position of the sequence number X. The controller 156 then sorts the indirection table 154 by the sequence numbers X, as previously described above with reference to step 386. Control then continues to block 2099 where the logic of FIG. 20 returns.

Figure 21:
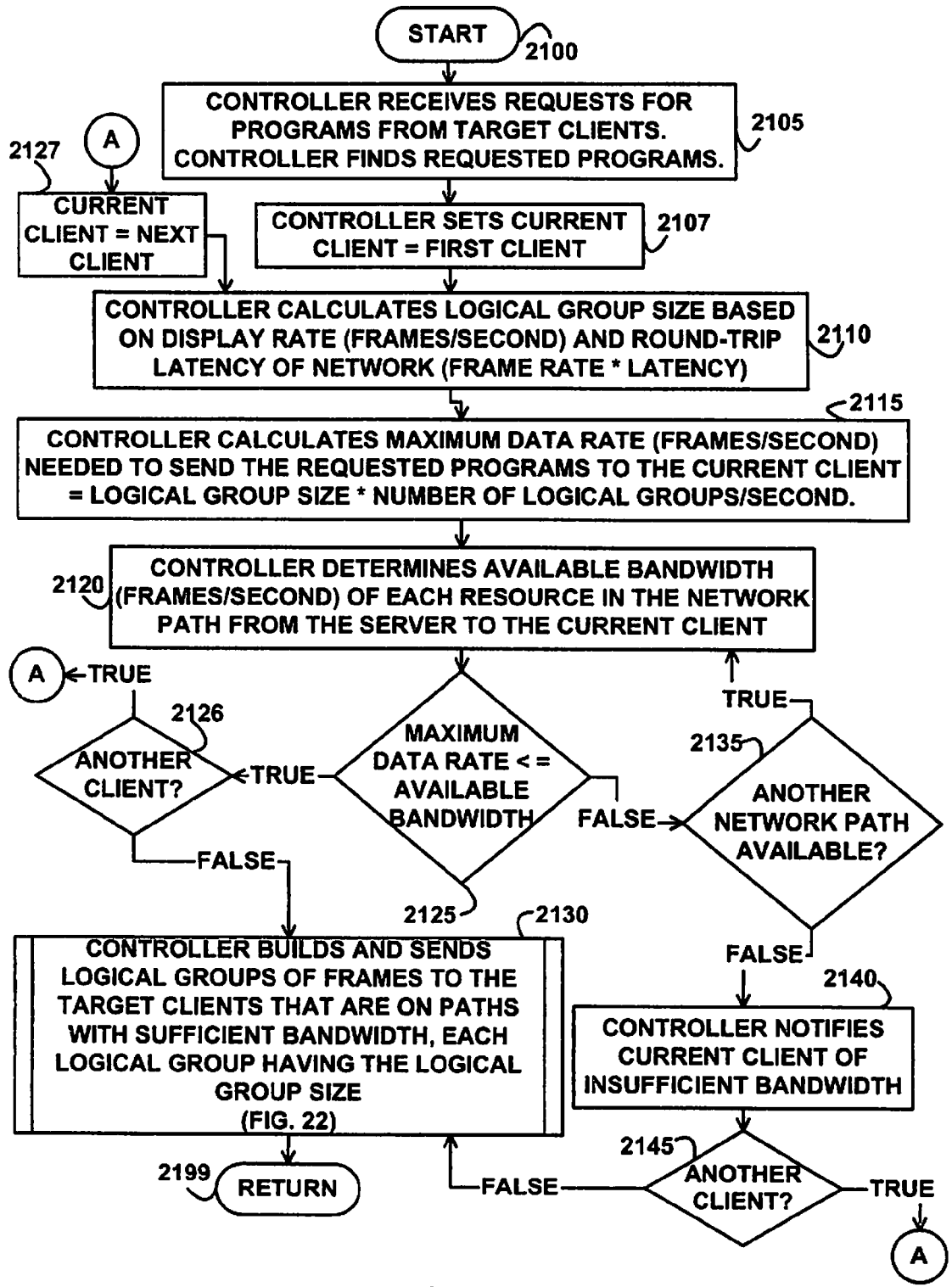
FIG. 21 depicts a flowchart of example processing for determining whether to send frames to target clients, according to an embodiment of the invention.

FIG. 21 depicts a flowchart of example processing for determining whether to send frames to target clients, according to an embodiment of the invention. Control begins at block 2100. Control then continues to block 2105 where the controller 156 receives requests for programs 150 from target clients 135 and 136. The requests ask that data content of the programs 150 be transmitted to the target clients. The controller 156 finds the requested programs 150.

Control then continues to block 2107 where the controller 156 sets the current target client to be the first target client that requested content of a program to be transferred. In an embodiment, the first target client is the requesting client that least recently requested transmission of program content (the client whose request is the oldest), so that the logic of FIG. 21 denies only the most recent client requests whose paths have insufficient bandwidth to perform the requested transmission. Control then continues to block 2110 where the controller 156 calculates the logical group size for the frames in the programs based on the display frame rate (the number of frames per second at which the frames are to be displayed at the user terminal 121 of the current target client) and the round-trip latency of the network. The round trip latency is the amount of time needed for the controller 156 to send a logical group of frames to the current target client and receive an optional acknowledgment of receipt by the current target client. In an embodiment, the controller 156 calculates the logical group size to be the display frame rate multiplied by the round trip latency.

Control then continues to block 2115 where the controller 156 calculates the maximum data rate (the maximum number of frames per second) needed to send the requested program to the current target client. In an embodiment, the controller 156 calculates the maximum data rate to be the logical group size (previously calculated at block 2110) multiplied by the number of logical groups per second needed in order to supply the display rate. The number of logical groups per second needed in order to supply the display rate (frames per second) is the display frame rate multiplied by the number of frames in a logical group.

Control then continues to block 2120 where the controller 156 determines the available bandwidth (frames per second) of each resource 134 in the network path from the server to the current target client and selects the smallest of those available bandwidths (the bottleneck bandwidth, which is the total available bandwidth of the path). The controller 156 treats as unavailable the bandwidth of a resource that was already allocated to a previous client by a previous iteration of the processing loop of FIG. 21. Control then continues to block 2125 where the controller 156 determines whether the maximum data rate (previously calculated at block 2115) is less than or equal to the total available bandwidth of the path (previously determined at block 2120).

If the determination at block 2125 is true, then the maximum data rate is less than or equal to the total available bandwidth of the path from the server to the current target client, so the controller 156 allocates the bandwidth of the resources in the path to current target client (for the purposes of the calculations of FIG. 21). Control then continues to block 2126 where the controller 156 determines whether another target client exists that has issued a request for transmission of content of a program and that has not yet been processed by the logic of FIG. 21. If the determination at block 2126 is true, then another target client exists that has issued a request for transmission of content of a program and that has not yet been processed by the logic of FIG. 21, so control continues to block 2127 where the controller 156 sets the current target client to be the next unprocessed target client (the unprocessed target client with the next newest request) that has issued a request for transmission of content of a program. Control then returns to block 2110, as previously described above.

Figure 22:
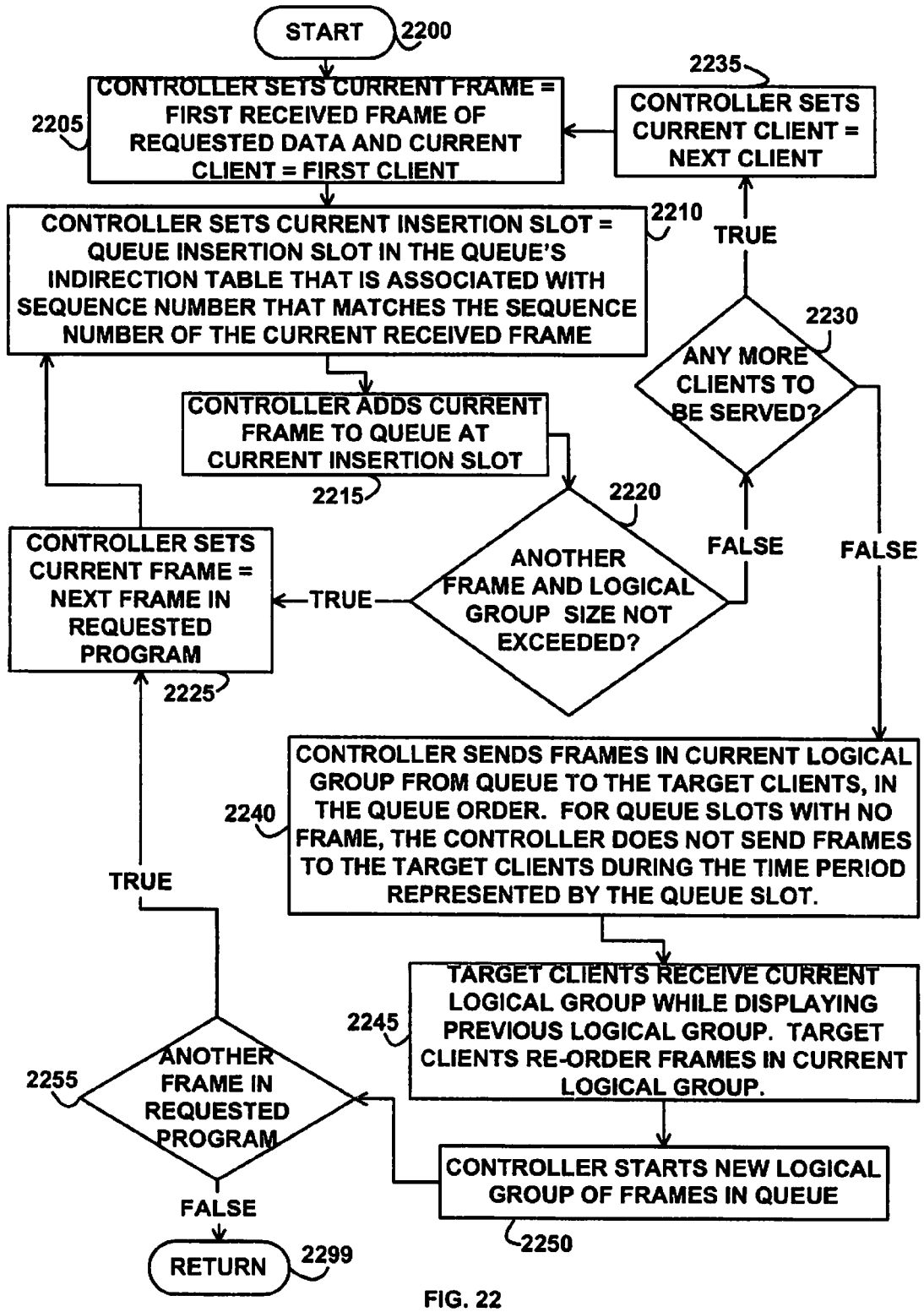
FIG. 22 depicts a flowchart of example processing for sending frames to target clients, according to an embodiment of the invention.

If the determination at block 2126 is false, then another target client does not exist that has issued a request for transmission of content of a program and that is unprocessed by the logic of FIG. 21, so control continues to block 2130 where the controller 156 builds and sends logical groups of frames to the target clients that are on paths with sufficient bandwidth (i.e., for those target clients whose maximum data rate was less than or equal to the available bandwidth of its path), each logical group having the logical group size, as further described below with reference to FIG. 22. Control then continues to block 2199 where the logic of FIG. 21 returns.

If the determination at block 2125 is false, then the maximum data rate is greater than the total available bandwidth of the path, so control continues to block 2135 where the controller 156 determines whether another network path from the server computer system 100 to the current target client that passes through at least one different resource is available. If the determination at block 2135 is true, then another network path with at least one different resource is available, so control returns to block 2120 where the controller 156 determines the available bandwidth of each resource 134 in the different network path from the server to the current target client, as previously described above.

If the determination at block 2135 is false, then another network path with at least one different resource is not available and all network paths from the server computer system 100 to the current target client have been investigated for suitability by blocks 2120 and 2125, so control continues from block 2135 to block 2140 where the controller 156 sends a message to, or otherwise notifies, the current target client that the network path between the server computer system and the current client computer systems has insufficient bandwidth to support the display frame rate of its requested program. Thus, the controller 156 does not send the requested program to the current target client. Control then continues to block 2145 where the controller 156 determines whether another target client exists that has issued a request for transmission of content of a program and that has not yet been processed by the logic of FIG. 21. If the determination at block 2145 is true, then another target client exists that has issued a request for transmission of content of a program and that has not yet been processed by the logic of FIG. 21, so control continues to block 2127 where the controller 156 sets the current target client to be the next unprocessed target client that has issued a request for transmission of content of a program. Control then returns to block 2110, as previously described above.

If the determination at block 2145 is false, then another unprocessed (by the logic of FIG. 21) target client does not exist that has issued a request for transmission of content of a program, so control continues to block 2130, as previously described above.

FIG. 22 depicts a flowchart of example processing for sending frames to target clients, according to an embodiment of the invention. Control begins at block 2200. Control then continues to block 2205 where the controller 156 sets the current received frame to be the first frame in the requested program and sets the current client to be the first client with an outstanding request for a program.

Control then continues to block 2210 where the controller 156 sets the current insertion slot in the queue 152 to be the queue insertion slot specified by the queue's indirection table 154 that is associated with the sequence number that matches the sequence number (in the arrival order) of the current received frame. Control then continues to block 2215 where the controller 156 adds the current received frame to the queue 152 at the current insertion slot.

Control then continues to block 2220 where the controller 156 determines whether another received frame exists in the program requested by the current client and the logical group size of the logical group of frames in the queue 152 has not been exceeded by the number of frames in the queue 152. If the determination at block 2220 is true, then another received frame exists and the logical group size has not been exceeded by the number of frames currently in the queue 152, so control continues to block 2225 where the controller 156 sets the current frame to be the next received frame in the requested program in the sequence arrival order of received frames. Control then returns to block 2210, where the controller 156 processes the current received frame, as previously described above.

If the determination at block 2220 is false, then another received frame does not exist or the logical group size has been exceeded by the number of frames currently in the queue 152, so control continues to block 2230 where the controller 156 determines whether any client that has sent a request for a program remain to be served by the processing of FIG. 22. If the determination at block 2230 is true, than at least one client exists that has sent a request for a program and that remains to be served by the processing of FIG. 22, so control continues to block 2235 where the controller 156 sets the current client being processed by the logic of FIG. 22 to be the next client whose requested frames have not yet been added to the queue 152. Control then returns to block 2205 where the controller 156 begins processing the frames for the new current client, as previously described above.

If the determination at block 2230 is false, then all clients that have requested a program have been processed by the logic of FIG. 22, so control continues to block 2240 where the controller 156 sends or transmits the frames from the queue to the target clients in the queue order (the transmission order), which is the order specified by the slot numbers in the queue 152. For queue slots with no frame, i.e., the queue slot is empty or has no content, the controller 156 does not send any frame to the target client during the time period represented by the respective empty queue slot.

Control then continues to block 2245 where each target client receives its respective current logical group while each target client displays its previously received logical group. The target clients reorder the received frames in the current logical group prior to displaying the frames, so that the displayed frames are in the original display order, as shown in FIG. 2A. Control then continues to block 2250 where the controller 156 starts a new logical group of frames in the queue 152. In various embodiments, the controller 156 erases previously sent frames from the queue 152, or otherwise marks the queue slots with previously sent frame content as empty.

Control then continues to block 2255 where the controller 156 determines whether another received frame exists in any program requested by any target client that has not yet been transmitted by the logic of FIG. 22. If the determination at block 2255 is true, then another received frame exists in a program requested by a target client that has not yet been transmitted, so control continues to block 2225 where the controller 156 sets the current frame to be the next frame in the requested program.

If the determination at block 2255 is false, then all frames in all requested programs for all clients have been processed by the logic of FIG. 22, so control continues to block 2299 where the logic of FIG. 22 returns.

The previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
receiving a plurality of frames in an arrival order, wherein each of the plurality of frames has a respective target client and a respective sequence number that represents a relative position of the respective frame in the arrival order;
determining a transmission order based on a bit reversal of the sequence numbers, wherein the determining further comprises selecting a respective slot in a queue for each of the respective frames, wherein the selecting further comprises creating a respective slot number of the respective slot based on a bit reversal of an order of a plurality of bits of the respective sequence number and adding the respective frame to the respective slot; and
sending each of the respective frames to the respective target client in the transmission order, wherein the sending further comprises sending the respective frame from the respective slot in the queue to the respective target client during a respective time period that is associated with the respective slot if the respective slot contains the respective frame and refraining from sending data during the respective time period if the respective slot is empty.

2. The method of claim 1, further comprising:
receiving a plurality of requests from the respective target clients, wherein the plurality of requests specify a plurality of respective programs, wherein the programs comprise the plurality of frames.

3. The method of claim 1, wherein the creating the respective slot number further comprises:
determining that the queue has a length that is a binary power; and
setting the respective slot number to the respective bit reversal of the order of the plurality of bits.

4. The method of claim 1, wherein the creating the respective slot number further comprises:
determining that the queue has a length that is not a binary power;
creating a list comprising a plurality of pairs of the sequence numbers and the bit reversals of the sequence numbers;
sorting the list by the bit reversals of the sequence numbers;
assigning a respective sorted position to each of the respective sequence numbers in response to the sorting; and
setting the respective slot for the sequence number to be the respective sorted position of the sequence number in the list.

5. The method of claim 1, further comprising:
calculating a size of a logical group of a subset of the plurality of frames based on a display rate of the subset and a round-trip latency of a network to which one of the target clients is connected; and
calculating a maximum data rate needed to send one of the programs to the target client based on the size of the logical group and a transfer rate for the logical group.

6. The method of claim 5, further comprising:
determining an available bandwidth of each resource in a path in the network to the one of the target clients; and
notifying the one of the target clients of insufficient bandwidth if the maximum data rate is less than the available bandwidth.

7. A non-transitory computer-readable storage medium encoded with instructions, wherein the instructions when executed comprise:
receiving a plurality of frames in an arrival order, wherein each of the plurality of frames has a respective target client and a respective sequence number that represents a relative position of the respective frame in the arrival order;
determining a transmission order based on a bit reversal of the sequence numbers, wherein the determining further comprises selecting a respective slot in a queue for each of the respective frames, wherein the selecting further comprises creating a respective slot number of the respective slot based on a bit reversal of an order of a plurality of bits of the respective sequence number and adding the respective frame to the respective slot; and sending each of the respective frames to the respective target client in the transmission order, wherein the sending further comprises sending the respective frame from the respective slot in the queue to the respective target client during a respective time period that is associated with the respective slot if the respective slot contains the respective frame and refraining from sending data during the respective time period if the respective slot is empty.

8. The non-transitory computer-readable storage medium of claim 7, further comprising:

receiving a plurality of requests from the respective target clients, wherein the plurality of requests specify a plurality of respective programs, wherein the programs comprise the plurality of frames.

9. The non-transitory computer-readable storage medium of claim 7, wherein the creating the respective slot number further comprises:

determining that the queue has a length that is a binary power; and setting the respective slot number to the respective bit reversal of the order of the plurality of bits.

10. The non-transitory computer-readable storage medium of claim 7, wherein the creating the respective slot number further comprises:

determining that the queue has a length that is not a binary power;

creating a list comprising a plurality of pairs of the sequence numbers and the bit reversals of the sequence numbers;

sorting the list by the bit reversals of the sequence numbers;

assigning a respective sorted position to each of the respective sequence numbers in response to the sorting; and setting the respective slot for the sequence number to be the respective sorted position of the sequence number in the list.

11. The non-transitory computer-readable storage medium of claim 7, further comprising:

calculating a size of a logical group of a subset of the plurality of frames based on a display rate of the subset and a round-trip latency of a network to which one of the target clients is connected;

calculating a maximum data rate needed to send one of the programs to the target client based on the size of the logical group and a transfer rate for the logical group;

determining an available bandwidth of each resource in a path in the network to the one of the target clients; and notifying the one of the target clients of insufficient bandwidth if the maximum data rate is less than the available bandwidth.

12. A computer system comprising:

a processor; and memory connected to the processor, wherein the memory encodes instructions that when executed by the processor comprise:

receiving a plurality of requests from a plurality of respective target clients, wherein the plurality of requests specify a plurality of respective programs, wherein the programs comprise a plurality of frames, receiving the plurality of frames in an arrival order, wherein each of the plurality of frames has one of the respective target clients and a respective sequence number that represents a relative position of the respective frame in the arrival order, determining a transmission order based on a bit reversal of the sequence numbers, wherein the determining further comprises selecting a respective slot in a queue for each of the respective frames, wherein the selecting further comprises creating a respective slot number of the respective slot based on a bit reversal of an order of a plurality of bits of the respective sequence number and adding the respective frame to the respective slot, and sending each of the respective frames to the respective target client in the transmission order, wherein the sending further comprises sending the respective frame from the respective slot in the queue to the respective target client during a respective time period that is associated with the respective slot if the respective slot contains the respective frame and refraining from sending data during the respective time period if the respective slot is empty.

13. The computer system of claim 12, wherein the creating the respective slot number further comprises:

determining that the queue has a length that is a binary power; and setting the respective slot number to the respective bit reversal of the order of the plurality of bits.

14. The computer system of claim 12, wherein the creating the respective slot number further comprises:

determining that the queue has a length that is not a binary power;

creating a list comprising a plurality of pairs of the sequence numbers and the bit reversals of the sequence numbers;

sorting the list by the bit reversals of the sequence numbers;

assigning a respective sorted position to each of the respective sequence numbers in response to the sorting; and setting the respective slot for the sequence number to be the respective sorted position of the sequence number in the list.

* * * * *